United States Patent
Brown et al.

(10) Patent No.: US 12,000,935 B2
(45) Date of Patent: Jun. 4, 2024

(54) SYSTEMS, MEDIA, AND METHODS FOR PROCESSING AN INTEGRATED SIGNAL HAVING A PLURALITY OF SIGNAL COMPONENTS WITH ARBITRARY POWER ALLOCATION

(71) Applicant: NovAtel Inc., Calgary (CA)

(72) Inventors: David A. Brown, Calgary (CA); Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 276 days.

(21) Appl. No.: 17/543,002

(22) Filed: Dec. 6, 2021

(65) Prior Publication Data

US 2023/0176230 A1 Jun. 8, 2023

(51) Int. Cl.
*G01S 19/22* (2010.01)
*G01S 19/21* (2010.01)
(Continued)

(52) U.S. Cl.
CPC .............. *G01S 19/22* (2013.01); *G01S 19/21* (2013.01); *G01S 19/24* (2013.01); *G01S 19/37* (2013.01)

(58) Field of Classification Search
CPC .......... G01S 19/22; G01S 19/21; G01S 19/24; G01S 19/37
(Continued)

(56) References Cited

U.S. PATENT DOCUMENTS 6,370,207 B1 4/2002 Weill et al.
7,885,317 B2 2/2011 Fenton
(Continued)

FOREIGN PATENT DOCUMENTS

EP 1 805 527 B1 8/2008
WO WO-2021205272 A1 * 10/2021 ............. G01S 19/02

OTHER PUBLICATIONS

Constant Envelope Combination for Components on Different Carrier Frequencies with Unequal Power Allocation, Yao and Lu, Tsinghau University, China. International Technical Meeting (ITM) of the Institute of Navigation (ION), San Diego, CA, Jan. 28-30, 2013, 10 pages.

(Continued)

*Primary Examiner* — Harry K Liu

(74) *Attorney, Agent, or Firm* — Cesari and McKenna, LLP

(57) ABSTRACT

An integrated GNSS signal having a plurality of signal components with arbitrary power allocation may be processed. In an embodiment, an integrated signal processing unit of a GNSS receiver may generate in parallel complex rotated samples for a sample of the integrated signal. The complex rotated samples (e.g., early and late complex rotated samples) may be accumulated in parallel in a window that spans any arbitrary width that is less than or equal to a number of code chips in a PRN code sequence. In an embodiment, the integrated signal processing unit may sequentially generate complex rotated samples for the sample. The complex rotated samples (e.g., early, punctual, and late complex rotated samples) may be sequentially accumulated in the window. The GNSS receiver may utilize the accumulated complex rotated samples to perform correlation techniques, perform multipath mitigation techniques, and/or track the integrated signal.

20 Claims, 13 Drawing Sheets

(51) Int. Cl.
*G01S 19/24* (2010.01)
*G01S 19/37* (2010.01)

(58) Field of Classification Search
USPC .......................................................... 342/352
See application file for complete search history.

(56) References Cited

U.S. PATENT DOCUMENTS

| | | |
|---|---|---|
| 8,442,097 B2 | 5/2013 | Fenton |
| 8,467,433 B2 | 6/2013 | Fenton |
| 2021/0367681 A1* | 11/2021 | Hess ..................... H04B 1/123 |

OTHER PUBLICATIONS

Design, Implementation, and Performance Analysis of ACE-BOC Modulation, Yao and Lu, Tsinghau University, China. Proceedings of the 26'th ITM of ION Satellite Division, ION GNSS+ 2013, Nashville, Tennessee, Sep. 16-20, 2013, 8 pages.

Applications and Low-complex Implementations of ACE-BOC Multiplexing, Yao and Lu. Tsinghau University, China. Proceedings of the 2014 ITM of ION San Diego, California, Jan. 27-29, 2014, 12 pages.

ACE-BOC: Dual-Frequency Constant Envelope Multiplexing for Satellite Navigation, Yao and Lu. Tsinghau University, Beijing, China. IEEE Transaction on Aerospace and Electronics Systems vol. 52, No. 1 Feb. 2016, 21 pages.

European Search Report and Written Opinion dated Sep. 7, 2022 for European Patent Application No. 22158140.8 for NovAtel Inc., 11 pages.

Zhang et al., "Application and Low-complexity Implementation of ACE-BOC Multiplexing," ITM 2014—Proceedings of the 2014 International Technical Meeting of the Institute of Navigation, the Institute of Navigation, 8551 Rixlew Lane Suite 360 Manassas, VA 20109 USA, Jan. 29, 2014, pp. 781-791.

\* cited by examiner

SYSTEMS, MEDIA, AND METHODS FOR PROCESSING AN INTEGRATED SIGNAL HAVING A PLURALITY OF SIGNAL COMPONENTS WITH ARBITRARY POWER ALLOCATION

BACKGROUND

Technical Field

The invention relates generally to a Global Navigation Satellite System (GNSS), and more particularly, to a GNSS receiver for processing an integrated signal with a plurality of signal components with arbitrary power allocation.

Background Information

With the development of global navigation satellite systems (GNSS), an increasing number of GNSS signals are broadcast to provide diversified services (e.g., positioning, navigation, timing, etc.). In order to save resources when providing such services, multiple signals may be required to be multiplexed into a composite signal. Furthermore, the composite signal may have a constant-envelope characteristic to mitigate signal distortion that may be caused by, for example, nonlinear amplification.

Asymmetric Constant Envelope Binary Offset Carrier (ACE-BOC) is a dual-frequency constant envelop multiplexing technique that allows for the modulation of four independent spread spectrum codes into two different carrier frequencies of an integrated signal with arbitrary power ratio combinations. Compared to other constant envelop multiplexing techniques, ACE-BOC may provide higher design flexibility in the number of signal components, power ratio among components, etc. Such design flexibility may provide for diversity in signal scheme optimization that may be needed for the different services. However, the design flexibility associated with the integrated signal can result in complexities in processing the integrated signal.

SUMMARY

In one or more embodiments, the systems, media, and methods, process an integrated signal having a plurality of signal components with arbitrary power allocation. In an embodiment, an integrated signal processing unit may generate complex rotated samples in parallel for a sample of the integrated signal, such that the complex rotated samples for the sample can be accumulated in parallel in a window that spans any arbitrary width that is less than or equal to a number of code chips in a pseudorandom noise (PRN) code sequence. For example, the window may span at least 1.5 code chips (e.g., 2 code chips, 3 code chips, 10 code chips, etc.).

In an implementation, the integrated signal processing unit of a Global Navigation Satellite System (GNSS) receiver may generate a local code for the sample of the is integrated signal, where the local code may correspond to a code in the integrated signal. The integrated signal processing unit may select a phase rotation value and a code shift value based on the local code. For example, the phase rotation value and the code shift value may be selected from a shift/phase lookup table. The integrated signal processing unit may generate, in parallel, an early complex rotated sample and a late complex rotated sample for the sample based on the selected phase rotation value.

The integrated signal processing unit may generate, in parallel and utilizing the selected code shift value, an early code phase value and a late code phase value that span at least 1.5 code chips (e.g., 2 code chips), wherein the late code phase value is offset in time by 1 pseudorandom noise (PIM) chip worth of code phase. The integrated signal processing unit may utilize the early and late code phase values to generate a final bin enables output from an early bin enables output and a late bin enables output. The integrated signal processing unit may accumulate, in parallel, the complex rotated samples (e.g., early and late complex rotated samples) for the single sample utilizing the final bin enables output generated for a window that spans at least 1.5 code chips (e.g., 2 code chips).

For example, the final bin enables output may be utilized to accumulate in parallel the early and late complex rotated samples in one or two bins of a plurality of bins that span at least 1.5 code chips (e.g., 2 code chips). The plurality of bins may be used to produce correlation values that may be needed to perform one or more correlation techniques and/or one or more multipath mitigation techniques. In addition or alternatively, the weighting bins may utilize the early bin enables output and the late bin enables output to accumulate in parallel the early and late complex rotated samples for a window that spans 1.5 code chips (e.g., 2 code chips) for tracking the integrated signal.

In an embodiment, the integrated signal processing unit may sequentially generate complex rotated samples for a sample of the integrated signal, such that the complex rotated samples for the sample can be sequentially accumulated in a window that spans at least 1.5 code chips (e.g., 3 code chips or 10 code chips). Specifically, the integrated signal processing unit may generate a plurality of local codes for a sample of the integrated signal, where the plurality of local codes correspond to a code in the integrated signal. For example, the plurality of local codes may include an early version of the code in the integrated signal, a punctual version of the code in the integrated signal, and a late version of the code in the integrated signal.

The integrated signal processing unit may provide a local code of the plurality of local codes to the shift/phase lookup table based on a value of a counter that starts at a minimum value and increments to a value that corresponds to the number of the plurality of local codes. As such, each of the plurality of local codes is sequentially provided to the shift/phase lookup table as the counter increments.

The integrated signal processing unit may select a phase rotation value and a code shift value based on the provided local code. The integrated signal processing unit may generate a complex rotated sample based on the selected phase rotation value. The integrated signal processing unit may generate a code phase value based on the selected code shift value and by offsetting the selected code shift value in time, when appropriate, based on the value of the counter such that the window spans at least 1.5 code chips (e.g., 3 code chips).

For example, the code shift value selected based on the early version of the code may not be offset in time because the counter is a value of 0. The code shift value selected based on the punctual version of the code may be offset in time by 1 PRN chip worth of code phase because the counter is a value of 1. Additionally, the code shift value selected based on the late version of the code may be offset in time by 2 PRN chip worth of code phase because the counter is a value of 2. As such, and in this example, the window spans 3 code chips. Therefore, and in this example, a complex rotation value and a code phase value are sequentially generated for each of the plurality of local codes for a window that spans 3 code chips.

The integrated signal processing unit may generate a bin enables output based on the generated code phase value. The integrated signal processing unit may sequentially accumulate the complex rotated values for the single sample utilizing the respectively generated bin enables outputs for a window that spans at least 1.5 code chips (e.g., 3 code chips). For example, the complex rotated samples may be sequentially accumulated in a plurality of bins that span at least 1.5 code chips (e.g., 3 code chips) utilizing the respective bin enables outputs. The plurality of bins may be used to produce correlation values that may be needed to perform one or more correlation techniques and/or one or more multipath mitigation techniques. In addition or alternatively, weighting bins may utilize respective bin enables outputs to sequentially accumulate the complex rotated samples for a window that spans at least 1.5 code chips (e.g., 3 code chips or 10 code chips) for tracking the integrated signal.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
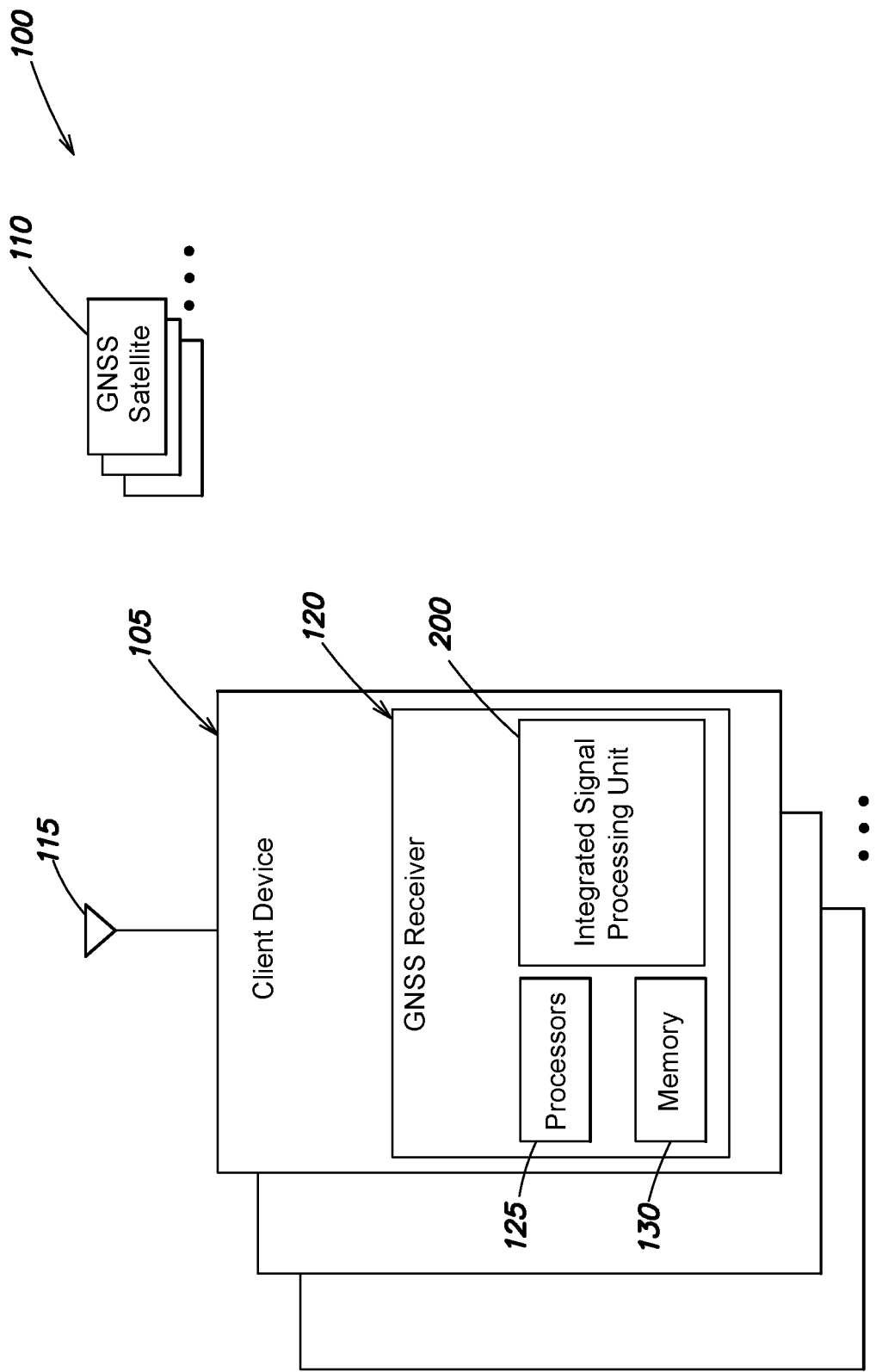
FIG. 1 is a schematic block diagram of a system according to one or more embodiments described herein.

Referring to FIG. 1, a system 100 includes one or more client devices 105 and one or more transmitters, such as one or more Global Navigation Satellite System (GNSS) satellites 110, that transmit one or more navigation signals, e.g., GNSS satellite signals (not shown). Although reference may be made to GNSS satellites 110 transmitting GNSS satellite signals, it is expressly contemplated the one or more embodiments described herein may be utilized with any of a variety of different transmitters, e.g., terrestrial transmitters, that transmit any of a variety of different navigation signals. As such, the description of GNSS satellites 110 that transmit GNSS signals should be taken for illustrative purposes only.

The GNSS satellites 110 may be associated with one or more satellite navigation system such as, but not limited to, Galileo, BeiDou Navigation Satellite System (BDS), Global Positioning System (GPS), and/or GLONASS. For example, the GNSS satellites 110 may transmit one or more integrated signals, i.e., integrated GNSS signals, that are based on Asymmetric Constant Envelope Binary Offset Carrier (ACE-BOC) multiplexing. According to the one or more embodiments described herein, an integrated signal may be referred to as an ACE-BOC signal. ACE-BOC multiplexing may combine four or fewer signal components (e.g., four or fewer independent, bipolar, direct sequence spread spectrum signals) at two different frequencies into a constant envelop integrated signal, where the signal components can have arbitrary power ratio, modulation, and code rate. For example, the four signal components may be E5a-I, E5a-Q, E5b-I, and E5b-Q of the Galileo constellation of satellites, or B2a-I, B2a-Q, B2b-I, and B2b-Q of the BeiDou constellation of satellites.

The client device 105 is typically capable of moving and includes an antenna 115 and a GNSS receiver 120, i.e., a navigation receiver, with one or more processors 125 and a memory 130. For example, the client device 105 may be a cellphone, laptop computer, portable computer, a personal digital assistant, etc. In addition, the GNSS receiver 120 may be a single, dual, or multi-frequency receiver. The memory 130 may store one or more values associated with one or more embodiments described herein.

The one or more processors 125 execute integrated signal process unit 200 (e.g., 200A, 200B, 200C, 200D, 200E, and 200F) that may process an integrated signal that may, for example, have arbitrary power allocation among signal components according to the one or more embodiments described herein.

Figure 2A:
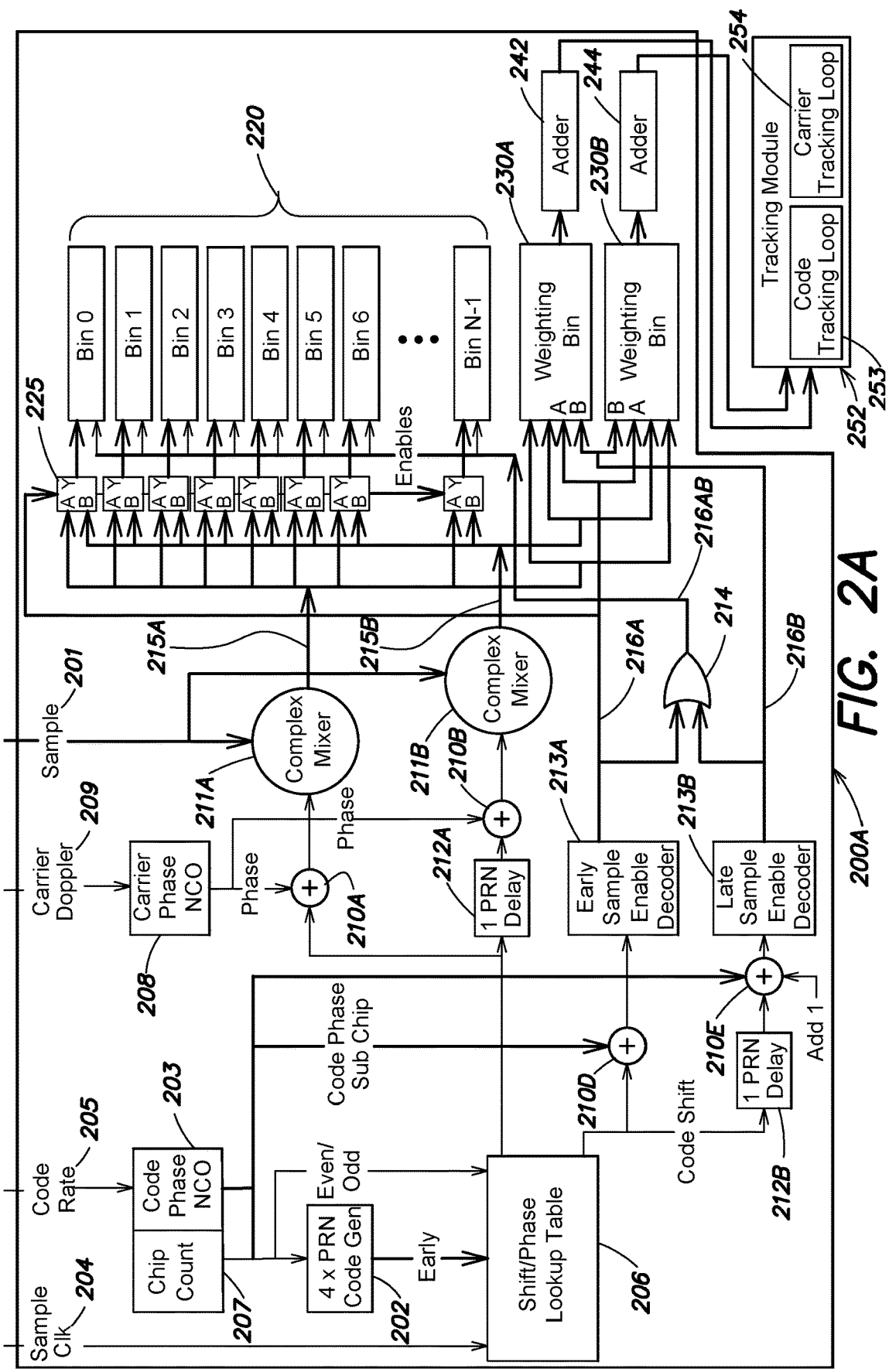
FIG. 2A is a schematic block diagram of an integrated signal processing unit that may process an integrated signal by generating complex rotated samples in parallel for a sample of the integrated signal according to one or more embodiments described herein.

FIG. 2A is a schematic block diagram of an integrated signal processing unit 200A that may process an integrated signal by generating complex rotated samples in parallel for a sample of the integrated signal according to one or more embodiments described herein.

According to the one or more embodiments described herein and as will be described in further detail below with reference to FIG. 2A through FIG. 4, samples of the integrated signal, taken in synchronism with a sample clock 204, may be processed by generating in parallel early and late complex rotated samples 215A and 215B for each sample 201. The complex rotated samples 215A and 215B for the sample 201 may be accumulated in parallel in a plurality of a number (N) of bins 220 that span any arbitrary width that is less than or equal to a number of code chips in a pseudorandom noise (PRN) code sequence. For example, the window may span at least 1.5 code chips (e.g., 2 code chips). In an implementation, bins 220 may accumulate (sum) complex rotated sample for some predetermined period of time. The bins may be hardware, software, or a combination thereof.

GNSS receiver 105 may use the complex rotated samples accumulated (e.g., 215A and 215B) in selected bins 220 and/or selected groups of bins 220 for a plurality of samples, to produce correlation values that may be needed to perform one or more correlation techniques, one or more multipath mitigation techniques, and/or to track the integrated signal as will be described in further detail below. In addition or alternatively, and as will be described in further detail below, weighted vectors may be utilized with the complex rotated samples (e.g., 215A and 215B) for the plurality of samples to, for example, produce correlation values that may be utilized to track the integrated signal.

In an implementation, the sizes and/or starting points of the bins 220, and/or the selection of the bins 220 for various groupings may be altered, to change the spacings, locations, and so forth to which the complex rotated samples correspond. As an illustrative example, let it be assumed that the bins 220 of FIG. 2A include 20 bins that are evenly spaced over a span of 2 code chips. In addition, let it be assumed that the first 10 bins (e.g., bin 0-bin 9) are "early bins" that span the first code chip and the second 10 bins (e.g., bin 10-bin 19) are "late bins" that span the second code chip.

Although the example as described with reference to FIGS. 2A through 4 may refer to 20 bins that are evenly spaced and span 2 code chips, it is expressly contemplated that the one or more embodiments described herein may be utilized with any number (N) of a plurality of bins 220 that span at least 1.5 chips, less than 1.5 chips, or any portion of a complete PRN code period. In an implementation, the bins 220 may be evenly spaced, unevenly spaced, etc. In an implementation, the number of the plurality of bins 220 may be between 18 and 24 bins. In an alternative implementation, the number of bins 220 may be any integer value. In an embodiment, a bin may correspond to a time slot or a slot of code phase values that is positioned within a window that spans 2 or more code chips.

Referring to FIG. 2A, a code phase numerically controlled oscillator (NCO) 203 may utilize a code rate 205 to produce fine code chip phase details that are used to represent estimated code phase values. For example, at each pulse of sample clock 204 at which samples of the integrated signal are taken, the code phase NCO 203 may produce a code phase sub chip value that indicates a time slot in a code chip for the sample 201. In an implementation, the code phase sub chip value is between 0 and 0.99. In an implementation, the code rate 205 may be asynchronous with the sample clock 204.

The code phase NCO 203 or a chip count 207 may drive the 4×PRN code generator 202 that may generate a local code, e.g., pseudorandom noise (PRN) code, for a sample 201 of the integrated signal, where the local code corresponds to one of the codes in the received integrated signal. For example, the first bit (e.g., the most significant bit) of the 4 bit code may correspond to an upper frequency in-phase signal ($S_{UI}$) associated with the integrated signal. The second bit of the 4 bit code may correspond to a lower frequency in-phase signal ($S_{LI}$) associated with the integrated signal. The third bit of the 4 bit code may correspond to an upper frequency quadrature-phase signal ($S_{UQ}$) associated with the integrated signal. The fourth bit (e.g., the least significant bit) of the 4 bit code may correspond to a lower frequency quadrature-phase signal ($S_{LQ}$) associated with the integrated signal.

When the sub chip value produced by the code phase NCO 203 rolls over to 1, the chip count 207 may be incremented, and a signal may be sent to the 4×PRN code generator 202 indicating a start of a new code chip. Based on the signal, the 4×PRN code generator 202 may generate the next 4 bits of the local code. When the chip count reaches the end of its count, e.g., 10229, it may roll back to zero and a reset signal may be sent to the 4×PRN code generator 202. In this example, the local code may be an early version of the code in the received integrated signal. The early version of the code may, for example, precede the code in the received integrated signal by 1 code chip, or one-half code chip, and so forth.

Continuing with the example where the plurality of bins 220 includes 20 evenly spaced bins over the 2 code chip window, let it also be assumed that for a pulse of the sample clock 204, the code phase NCO 203 produces a code phase sub chip value of 0.99 and the 4×PRN code generator 202, at this point in time, generates a local code of [1010]. In addition and for this example, let it be assumed that the local code generated by the 4×PRN code generator 202 for the previous code chip is [1111].

According to the one or more embodiments described herein, a shift/phase lookup table 206 may be utilized to select, by the integrated signal processing unit 200A and based on the local code, a code shift value and phase rotation value that are used to generate in parallel the early and late complex rotated samples 215A and 215B, for sample 201, that are accumulated in parallel in one or two bins of the plurality of bins 220, e.g., 20 bins, that span 2 code chips, as will be described in further detail below.

Specifically, and as will be described in further detail below, the phase rotation value selected from the shift/phase lookup table 206 may be used to generate the early complex rotated sample 215A and the late complex rotated sample 215B in parallel for the sample 201. In addition, and as will be described in further detail below, the code shift value selected from the shift/phase lookup table 206 may be utilized to (1) enable one or two bins of the plurality of bins 220 (e.g., 20 bins) that span 2 code chips, and (2) determine which complex rotated samples, e.g., early complex rotated sample 215A and late complex rotated sample 215B, for the sample 201 are provided to the enabled bins.

The sample clock 204 may be provided to the shift/phase lookup table 206 such that a code shift value and a phase rotation value are selected from the shift/phase lookup table 206 for each sample 201. In addition, and as known by those skilled in the art, a subcarrier that is mixed with the signal components of the integrated signal may be at a frequency of 15.345 MHz while the code rate may be 10.23 MHz. As such, the phase rotation value selected from the shift/phase lookup table 206 may need to be adjusted 180 degrees for odd code chips. Therefore, a least significant bit of the chip count 207 may be provided to the shift/phase lookup table 206 to indicate whether the code chip is even or odd.

Figure 3:
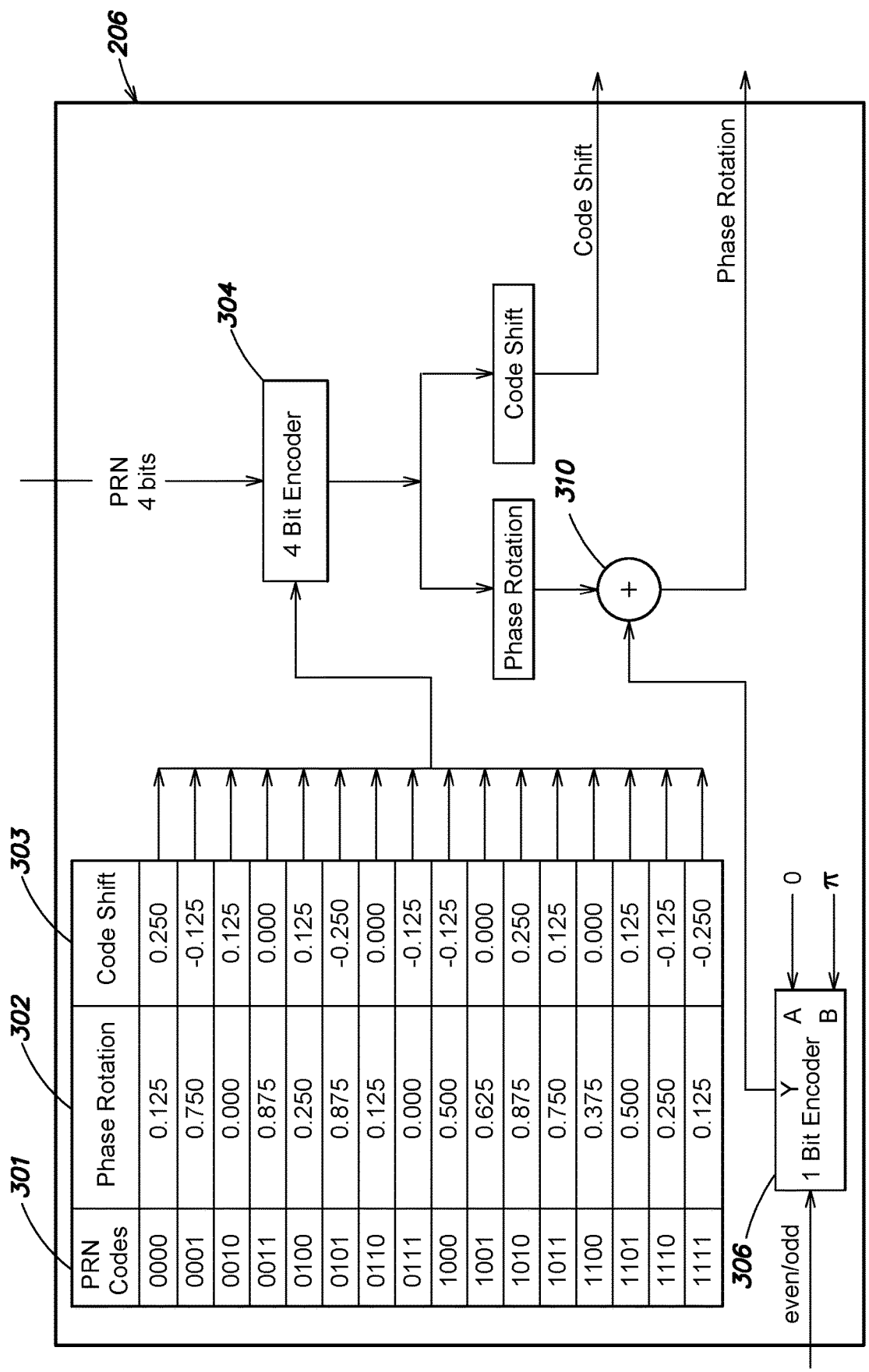
FIG. 3 is a schematic block diagram of the shift/phase lookup table according to the one or more embodiments described herein.

FIG. 3 is a schematic block diagram of the shift/phase lookup table 206 according to the one or more embodiments described herein. The processor 125 of the GNSS receiver 120 may initialize the shift/phase lookup table 206 such that each PRN code included in column 301 has a corresponding phase rotation value in column 302 and an code shift value in column 303. Specifically, the shift/phase lookup table 206 may be programmable such that the phase rotation values in column 302 and the code shift values in column 303 that correspond to the PRN codes in column 301 may change based on, for example, system requirements, user preferences, etc. For example, the code shift values in column 303 corresponding to the PRN codes in column 301 may change based on whether the system is to utilize symmetric shifting or positive shifting. In addition, the code shift values and phase rotation values corresponding to the PRN codes in column 301 may change based on a type of the integrated signal. For example, the code shift values and phase rotation values in the shift/phase lookup table 206 may change based on whether the integrated signal is an ACE-BOC type I signal, an ACE-BOC type II signal, or an ACE-BOC type III signal.

Although the shift/phase lookup table 206 includes particular values in columns 301, 302, and 303, it is expressly contemplated that the shift/phase lookup table 206 may include different values according to the one or more embodiments described herein. In addition, although reference is made to selecting a code shift value and phase rotation value corresponding to a local code utilizing the shift/phase lookup table 206 of FIG. 3, it is expressly contemplated that a code shift value and a phase rotation value corresponding to a local code may be selected in any of a variety of different ways.

As indicated above, in this example, the local code of is produced by the 4×PRN code generator 202. The local code of may be provided to a 4 bit encoder 304 of the shift/phase lookup table 206 and utilized to determine a row in column 301 that corresponds to the local code of to select a phase rotation value from column 302 and a code shift value from column 303. In this example, the local code of corresponds to row 11 of column 301. The phase rotation value of 0.875 in row 11 of column 302 and the code shift value of 0.250 in row 11 of column 303, both of which correspond to PRN code 1010, may be selected by the 4 bit encoder 304 and provided from the output of the 4 bit encoder 304. The code shift value 0.250 may be output from the 4-bit encoder 304 and provided as an output of the shift/phase lookup table 206. In an implementation, the code shift value may be 10 bits. In an implementation, the code shift value may be sign extended to be 13 bits.

The phase rotation value of 0.875 may be output from the 4 bit encoder and provided to an adder 310. If the least significant bit of the chip count 207, which is provided to a 1 bit encoder 306, indicates that the code chip is even, the 1 bit encoder 306 outputs a value of 0 to the adder such that the phase rotation value of 0.875 is not modified. However, if the least significant bit of the chip count 207 indicates that the code chip is odd, the 1 bit encoder outputs a value of $\pi$ such that the phase rotation value is adjusted by 180 degrees by adder 310. In this example, let it be assumed that the code chip is even. As such, the phase rotation value of 0.875 is not adjusted by adder 310 and is provided as output of the shift/phase lookup table 206.

The phase rotation value, e.g., 0.875, output from the shift/phase lookup table 206, may be utilized to generate the early complex rotated sample 215A and the late complex rotated sample 215B in parallel for the sample 201 according to one or more embodiments described herein and as will be described in further detail below.

Referring back to FIG. 2A, a carrier phase NCO 208 estimates a carrier phase value (e.g., sine and cosine transformations) based on an accumulated Carrier Doppler frequency 209. The carrier phase value from the Carrier Phase NCO 208, needed to correct signal 201 for Doppler effect, is added to the early phase rotation value (e.g., 0.875 output from the shift/phase lookup table 206) in adder 210A. The result of the addition may be an early complex phase rotation value. Complex mixer 211A may mix the sample 201 (e.g., multibit I and Q sample) with the early complex phase rotation value to obtain the early complex rotated sample 215A. The early complex rotated sample 215A may be provided to an input, e.g., input A, of each of a plurality of multiplexers 225.

To generate the late complex rotated sample 215B, the phase rotation value, e.g., 0.875, is delayed by 1 PRN. Specifically, the phase rotation value of 0.875 is provided to the 1 PRN delay 212A that may store the phase rotation value for the previous code chip. The phase rotation value of 0.875 provided to the 1 PRN delay 212A may act as a signal to the 1 PRN delay 212A indicating that the phase rotation value for the previous code chip is to be provided from the 1 PRN delay 212A to adder 210B. In this example, and as described above, the local code for the previous code chip is [1111]. Based on the shift/phase lookup table 206, the phase rotation value that corresponds to the PRN code [1111] is 0.125. As such and based on the phase rotation value of 0.875 being provided from the shift/phase lookup table 206 to the 1 PRN delay 212A, the 1 PRN delay 212A provides the phase rotation value of 0.125+0.5 for the previous code chip to adder 210B that adds the phase rotation value of 0.625 with the estimated carrier phase value to remove the Doppler effect.

The result of the addition by adder 210B may be a late complex phase rotation value. A complex mixer 211B may mix the sample 201 with the late complex phase rotation value to obtain the late complex rotated sample 215B. The late complex rotated sample 215B may be provided to an input, e.g., input B, of each of the plurality of multiplexers 225 that is different than the input to which the early complex rotated sample 215A is provided.

Therefore, the single sample 201 is utilized by the integrated signal processing unit 200A to generate the early and late complex rotated samples (215A and 215B) in parallel. As will be described in further detail below, the complex rotated samples may, for example, be provided from two multiplexers 225 to two enabled bins of the plurality of N bins, e.g., 20 bins, that span 2 code chips. As will be described in further detail below, the determination of which enabled bins the early and late complex rotated samples are respectively provided to may be based on the code shift value that is obtained from the shift/phase lookup table 206 and the Code Phase NCO.

The code shift value output from the shift/phase lookup table 206 may be utilized to generate, in parallel, the sample code phase values, e.g., an early sample code phase value and a late sample code phase value, that span 2 code chips. In this example, the code shift value of 0.250 that is output by the shift/phase lookup table 206 is provided to adder 210D. The adder 210D adds the code shift value of 0.250 to the code phase sub chip value of 0.99, that is provided by the code phase NCO 203 and that represents the time slot in the code chip for the sample 201, to obtain an early sample code phase value of 1.24. The early sample code phase value may be provided to early sample enable decoder 213A. The early sample enable decoder 213A may determine which of the plurality of bins 220 are enabled based on the provided early sample code phase value of 1.24. When the early sample code phase value is less than 1.0, the early sample code phase value may enable an early bin, e.g., one of bins 0-9, according to the one or more embodiments described herein. When the early sample code phase value is greater than 1.0, the early sample code phase value may enable a late bin, e.g., one of bins 10-19, according to the one or more embodiments described herein. In this example, the early sample code phase value of 1.24 is greater than 1.0, and accordingly the early sample code phase value of 1.24 enables a late bin as will be described in further detail below.

Figure 4:
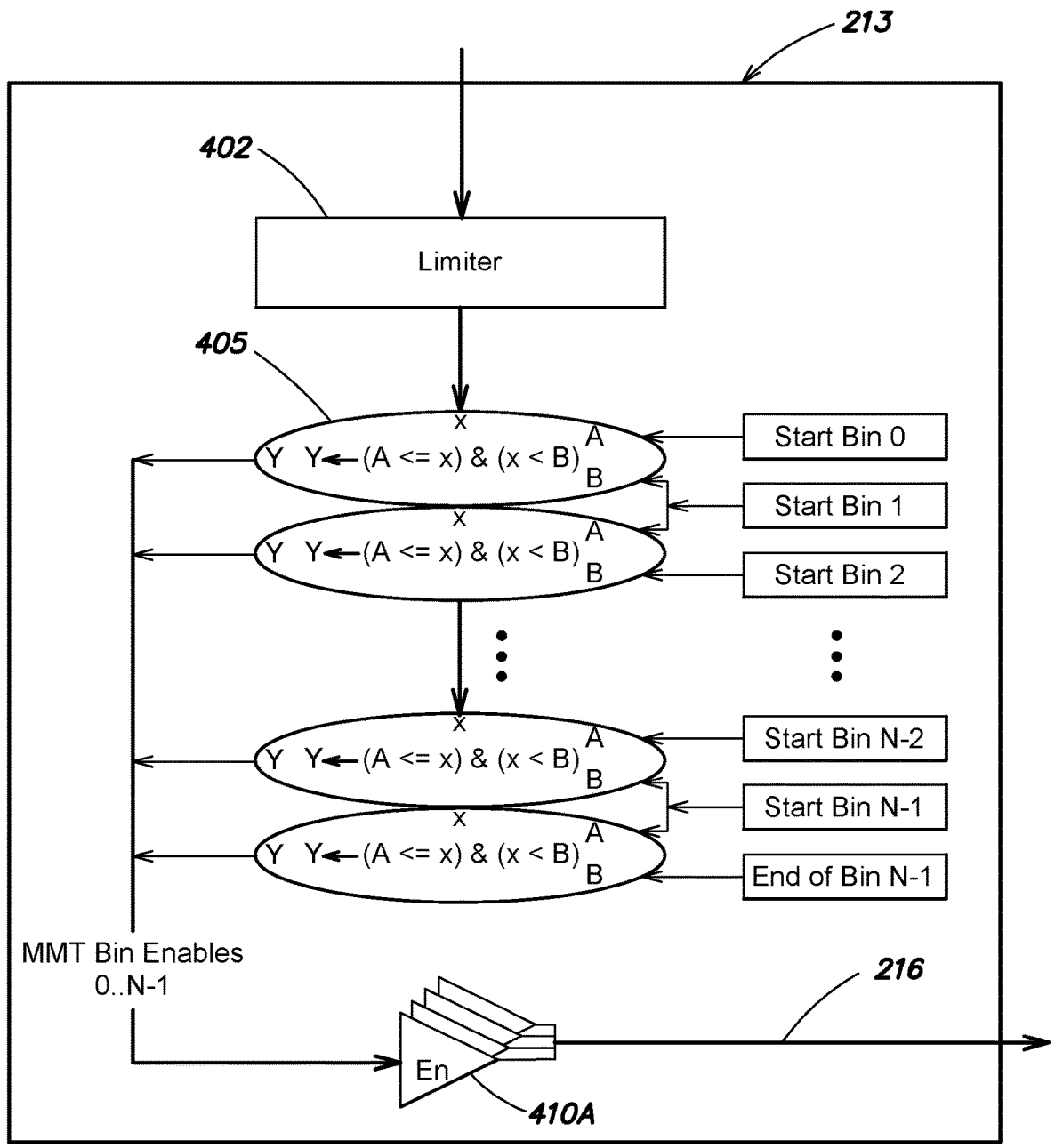
FIG. 4 is a schematic block diagram of a sample enable decoder according to the one or more embodiments described herein.

FIG. 4 is a schematic block diagram of a sample enable decoder 213, e.g., the early sample enable decoder 213A, according to the one or more embodiments described herein. The sample enable decoder 213 may include the starting locations for each bin of the plurality of bins 220, and the starting locations may be initialized by the processor 125. In this example, there are 20 evenly spaced bins that span 2 code chips. The following table illustrates where, for this example, each of the 20 bins may start with reference to the window that spans 2 code chips.

| Bin   | 0   | 1   | 2   | 3   | 4   | 5   | 6   | 7   | 8   | 9   |
|-------|-----|-----|-----|-----|-----|-----|-----|-----|-----|-----|
| Start | 0   | .1  | .2  | .3  | .4  | .5  | .6  | .7  | .8  | .9  |
| Bin   | 10  | 11  | 12  | 13  | 14  | 15  | 16  | 17  | 18  | 19  |
| Start | 1.0 | 1.1 | 1.2 | 1.3 | 1.4 | 1.5 | 1.6 | 1.6 | 1.8 | 1.9 |

The early sample code phase value may be provided to a limiter 402 of sample enable decoder 213 such that any negative values are set to 0. Alternatively, negative values for the early sample code phase value may simply be excluded (i.e., ignored) by the integrated signal processing unit 200A according to the one or more embodiments described herein. In this example, the early sample code phase value is 1.24, and thus is not set to 0, for example. As such, the early sample code phase value of 1.24 is provided to each of a plurality of comparators 405, e.g., N comparators, each of which may correspond to a different bin. Thus, in this example, there are 20 comparators each corresponding to a different bin of the 20 bins. Each of the plurality of comparators 405 may utilize the early sample code phase value, e.g., 1.24, to determine if a corresponding bin is to be enabled. The output of each of the plurality of comparators 405, e.g., Y, may be set to (i.e., ←) a value of 1 when a bin is to be enabled or set to (i.e., ←) a value of 0 when a bin is not to be enabled (e.g., remain disabled).

Specifically, and as depicted in FIG. 4, x represents the early sample code phase value, e.g., 1.24. For each comparator except the last comparator, A represents the starting value for a present bin and B represents a starting value for a next bin. If the early sample code phase value, e.g., x, falls within the range defined by the starting value of the present bin, e.g., A, and the starting value of the next bin, e.g., B, then it is determined that the present bin is to be enabled, e.g., Y is set to a value of 1. Specifically, if the early sample code phase value, e.g., x, is equal to or greater than A and less than B, the present bin is to be enabled, e.g., Y is set to a value 1, otherwise the bin is disabled/remains disabled, e.g., Y is set to a value of 0.

For the last comparator, A represents the starting value of the last bin and B may represent the ending value of the last bin. If the early sample code phase value, e.g., x, falls within the range defined by the starting value of the last bin, e.g., A, and the ending value of the last bin, e.g., B, then it is determined that the last bin is to be enabled, e.g., Y is set to a value of 1. Specifically, if the early sample code phase value, e.g., x, is equal to or greater than A and less than B, the last bin is to be enabled, e.g., Y is set to a value of 1, otherwise the final bin is disabled/remains disabled, e.g., Y is set to a value of 0. Alternatively, the last comparator may only utilize A that represents the starting value. In this embodiment, if the early sample code phase value, e.g., x, is equal to or greater than A, the last bin is to be enabled, e.g., Y is set to a value of 1, otherwise the bin is disabled/remains disabled, e.g., Y is set to a value of 0.

In this example, the early sample code phase value of 1.24 is utilized by each of the 20 comparators 405 to determine which bin(s) are to be enabled. Specifically, and in this example, a $13^{th}$ comparator, that corresponds to bin 12, determines that the early sample code phase value of 1.24 falls within the range of 1.2 (A) and 1.3 (B). Thus, the output of the $13^{th}$ comparator is an enable signal for bin 12, e.g., Y is set to a value of 1. All the other comparators, e.g., comparators 1-12 and 14-20, determine that the early sample code phase value of 1.24 does not fall within the defined ranges for the other comparators. As such, the output of the other comparators is a disable bin signal, e.g., Y is set to a value of 0.

Therefore, and in this example, the output from enabler 410A of the early sample enable decoder 213A is an early bin enables output 216A that is to enable bin 12 (a late bin) of the 20 bins. In an embodiment, the early bin enables output 216A may be a vector of 0's and 1's, where a 1 indicates that a bin is to be enabled while a 0 indicates that a bin is not to be enabled, e.g., remain disabled. As such, the early bin enables output 216A for this example may be: 0000 0001 0000 0000 0000, where the least significant bit of the vector represents bin 0 and the most significant bit represents bin 19. As will be described in further detail below, the early bin enables output 216A that is output by the early sample enable decoder 213A may be utilized to enable a bin of the plurality of bins 220, and may also be utilized to determine which complex rotated samples, e.g., early complex rotated sample 215A and late complex rotated sample 215B, are provided to which enabled bins.

Referring back to FIG. 2A, the code shift value, e.g., 0.250, obtained from the shift/phase lookup table 206 may be delayed by 1 PRN to generate a late sample code phase value that is utilized to enable a bin of the plurality of bins 220. Specifically, the code shift value of 0.250 is provided to the 1 PRN delay 212B that may store the code shift value for the previous code chip. The code shift value of 0.250 provided to the 1 PRN delay 212B may act as a signal to the 1 PRN delay 212B indicating that the code shift value for the previous code chip is to be provided from the 1 PRN delay 212B to adder 210E. In this example, and as described above, the local code generated for the previous code chip is [1111]. Based on the shift/phase lookup table 206, the code shift value that corresponds to PRN code [1111] is −0.250. As such, and based on the code shift value of 0.250 being provided from the shift/phase lookup table 206 to the 1 PRN delay 212B, the 1 PRN delay 212B may provide the code shift value of −0.250 for the previous code chip to adder 210E. The adder 210E may add the code shift value of −0.250 to the code phase sub chip value of 0.99 and to the value of 1 to produce the late sample code phase value of 1.74 (e.g., −0.250+0.99+1). The value of 1 is added by the adder 210E to offset the late sample code phase value in time by 1 PRN chip period (i.e., for the second code chip of the window that spans 2 code chips).

The late sample code phase value of 1.74 may be provided to the late sample enable decoder 213B. The late sample enable decoder 213B may determine which of the plurality of bins 220 is enabled based on the provided late sample code phase value of 1.74. When the late sample code phase value is less than 1.0, the late sample code phase value may enable an early bin, e.g., one of bins 0-9, according to the one or more embodiments described herein. When the late sample code phase value is greater than 1.0, the late sample code phase value may enable a late bin, e.g., one of bins 10-19, according to the one or more embodiments described herein. In this example, the late sample code phase value of 1.74 is greater than 1.0, and accordingly the late sample code phase value of 1.74 enables a late bin as will be described in further detail below.

Specifically, and with reference to FIG. 4, the sample decoder 213, e.g., the late sample enable decoder 213B, may utilize the final late sample code phase value 1.74 in a similar manner as described above, where x in FIG. 4 represents the late sample code phase value 1.74 instead of the early sample code phase value, e.g., 1.24, as described above for the early sample enable decoder 213A. More specifically, and in a similar manner as described above, each of the plurality of comparators 405 may utilize the late sample code phase value, e.g., 1.74, to determine if a corresponding bin is to be enabled. In this example, an $18^{th}$ comparator, that corresponds to bin 17, determines that the late sample code phase value of 1.74 falls within the range of 1.7 (A) and 1.8 (B). Thus, the output of the $18^{th}$ comparator is an enable signal for bin 17, e.g., Y is set to a value of 1. All the other comparators, e.g., comparators 1-17, 19, and 20, determine that the late sample code phase value of 1.74 does not fall within the defined ranges for the other comparators. As such, the output of the other comparators is a disable bin signal, e.g., Y is set to a value of 0. Therefore, and in this example, the output from enabler 410A of the late sample enable decoder 213B is a late bin enables output 216B that is to enable bin 17. In an embodiment, the late bin enables output 216B may be a vector of 0's and 1's, where a 1 indicates that a bin is enabled while a 0 indicates that a bin is disabled. As such, the late bin enables output 216B in this example may be: 0010 0000 0000 0000 0000, where the least significant bit of the vector represents bin 0 and the most significant bit represents bin 19.

As depicted in FIG. 2A, the early bin enables output 216A, e.g., 0000 0001 0000 0000 0000, and the late bin enables output 216B, e.g., 0010 0000 0000 0000 0000, may be respectfully provided from early sample enable decoder 213A and late sample enable decoder 213B to OR gate 214. The OR gate 214 may utilize the OR operation to produce a final bin enables output 216AB of 0010 0001 0000 0000 0000, where the least significant bit may represent bin 0 and the most significant bit may represent bin 19. The final bin enables output 216AB may be provided to the plurality of bins 220 that span 2 code chips to enable no bins of the plurality of bins 220, one bin of the plurality of 20 bins, or two bins of the plurality of bins 220. In this example, the final bin enables output 216AB is a vector of 0010 0001 0000 0000 0000 from OR gate 214 is provided to the bins 220 to enable bins 12 and 17 of the plurality of 20 bins that span 2 code chips.

Specifically, each bit of the final bin enables output 216AB may be respectfully provided to a corresponding bin, and a bin that is provided a value of 1, e.g., a high signal, is enabled while a bin that is provided a value of 0, e.g. a low signal, remains disabled. In this example, bins 12 and 17 are provided a value of 1, e.g., a high signal, while bins 0-11, 13-16, 18, and 19 are provided a value of 0, e.g., low signal. Therefore, bins 12 and 17 are enabled while bins 0-11, 13-16, 18, and 19 remain disabled.

Further, the early bin enables output 216A that is output from the early sample enable decoder 213A may be provided to a plurality of multiplexers 225 as depicted in FIG. 2A to determine which complex rotated samples, e.g., early complex rotated sample 215A and late complex rotated sample 215B, are provided to the enabled bins, e.g., bins 12 and 17. The number of multiplexers 225 may correspond to the number of bins 220 and each of the multiplexer 225 may be coupled to a different bin 220 as depicted in FIG. 2A. For example, and as depicted in FIG. 2A, a first multiplexer is coupled to bin 0, a second multiplexer is coupled to bin 1, and so forth. As such, and in this example, each of the 20 different multiplexers 225 is coupled to a different bin of the 20 bins that span 2 code chips. In an implementation, each multiplexer 225 has an output Y, an input A that receives the early complex rotated sample 215A and an input B that receives the late complex rotated sample 215B.

The early bin enables output 216A, e.g., 0000 0001 0000 0000 0000, may be provided to the multiplexers 225 as depicted in FIG. 2A. Specifically, each bit of the early bin enables output 216A, which may be a vector, may be provided to a different multiplexer 225 that corresponds to the appropriate bin. For example, the least significant bit of the early bin enables output 216A represents bin 0 and thus may be provided to the first multiplexer 225 that is coupled to bin 0. The most significant bit of the early bins enables output 216A represents bin 19 and thus is provided to the last multiplexer (e.g., multiplexer 20) that is coupled to bin 19 (e.g., bin N−1).

In an implementation, a multiplexer 225 that receives a high signal (e.g., value of 1), based on a bit of the early bin enables output 216A, provides the early complex rotated sample 215A that is received at input A as the output (e.g., Y). Further, a multiplexer 225 that receives a low signal (e.g., value of 0), based on a bit of the early bin enables output 216A, provides the late complex rotated sample 215B that is received at input B as the output (e.g., Y). In an implementation, only one multiplexer 225 is provided a high signal (e.g., a value of 1) such that only one multiplexer 225 provides the early complex rotated sample 215A as the output (e.g., Y), while all other multiplexers 225 are provided a low signal (e.g., a value of 0) such that all of the other multiplexer 225 provide the late complex rotated sample 215B as the output (e.g., Y).

In an alternative embodiment, the multiplexers may be configured and operate in an opposite manner (not shown), where the early bin enables output 216A of the early sample enable decoder 213A is inverted utilizing, for example, an inverter (not shown) that would be positioned between OR gate 214 and multiplexers 225. As such, the early bin enables 216A output of 0000 0001 0000 0000 0000 would be inverted to 1111 1110 1111 1111. Therefore, and in this alternative embodiment, a multiplexer 225 that receives a low signal (e.g., a value of 0), based on the inverted early bin enables output, would provide the early complex rotated sample that is received at input A as output (e.g., Y). Additionally, a multiplexer 225 that receives a high signal (e.g., a value of 1), based on a bit of the inverted early bin enables output 216A, would provide the late complex rotated sample that is received at input B as output (e.g., Y).

The early complex rotated sample 215A and/or late complex rotated sample 215B are then provided from the output (e.g., Y) of the multiplexer 225 to corresponding enabled bins. In this example, and as explained above, bins 12 and 17 are enabled based on the final bin enables output 216AB that is a vector of 0010 0001 0000 0000 0000 from the OR gate 214. In addition, and in this example, a 13$^{th}$ multiplexer that is coupled to enabled bin 12 receives a high signal, e.g., value of 1, based on the early bin enables output 216A, e.g., 0000 0001 0000 0000 0000.

As such, the early complex rotated sample 215A received at input A of the 13$^{th}$ multiplexer 225 is provided as output, e.g., Y, of the 13$^{th}$ multiplexer 225 and is provided to and accumulated in enabled bin 12. Further, and in this example, the 18$^{th}$ multiplexer that is coupled to enabled bin 17 receives a low signal, e.g., value of 0, based on the early bin enables output 216A. As such, the late complex rotated sample 215B received at input B of the 18$^{th}$ multiplexer 225 is provided as output, e.g., Y, of the 18$^{th}$ multiplexer 225 and is provided to and accumulated in enabled bin 17. Since the other multiplexers 225, e.g., 1-12, 14-17, 19, and 20, are coupled to bins that are disabled, output (e.g., the late complex rotated sample 215B) from the other multiplexers 225 are not accumulated in the disabled bins.

As such, two complex rotated samples, e.g., early complex rotated sample 215A and late complex rotated sample 215B, may be generated in parallel for a single sample 201 and accumulated in parallel in bins 220 that span 2 code chips as described above. Thus, and according to one or more embodiments described herein, a plurality of samples of the integrated signal, taken in synchronism with sample clock 204, may be processed by generating in parallel early and late complex rotated samples for each of the plurality of samples and accumulating the complex rotated samples in the plurality of bins 220 that span 2 code chips. The receiver may use the complex rotated samples accumulated in selected bins 220 and/or selected groups of bins 220 for the plurality of samples, to produce correlation values that may be needed to perform one or more correlation techniques and/or one or more multipath mitigation techniques.

More generally, the OR gate 214 and multiplexers 225 is only one way to provide the following desired functionality:

$$Bin_j = \sum_{i=0}^{T} [(216A_i \cdot IT_j) \times 215A_i + (216B_i \cdot IT_j) \times 215B_i]$$

where $IT_j$ is a binary vector (0s and 1s) for bin j of length N that contains all 0s except for a 1 in the j position, N is the total number of bins, $215A_i$ is the early complex rotated sample for sample i, 215B is the late complex rotated sample for sample i, $216A_i$ is the early bin enables output for sample i, $216B_i$ is the late bin enables output for is sample i, and T is the number of samples to accumulate. The DOT product "●" is defined as the sum of the products of the corresponding entries of two vectors of equal length i.e., $$a \cdot b = \sum_{1}^{n} a_i b_i$$

where n is the lengths of vectors a and b.

Additionally, the accumulated complex rotated samples may be utilized to, for example, calculate correlation measurements that may be utilized to track the integrated signal. As depicted in FIG. 2A, the complex rotated samples $215A_i$ and $215B_i$ generated in parallel for sample 201 (i) may be provided from the complex mixers 211A and 211B to the weighting bins 230A and 230B. Specifically, and as depicted in FIG. 2A, the early complex rotated sample 215A is provided from the complex mixer 211A to the first input (e.g., top arrow) of weighting bin 230A and the last input (e.g., bottom arrow) of weighting bin 230B. Further, and as depicted in FIG. 2A, the late complex rotated sample 215B is provided from the complex mixer 211B to the second input (e.g., second arrow from the top) of weighting bin 230A and the third input (e.g., third arrow from the top) of weighting bin 230B.

Additionally, the early bin enables output 216A and the late bin enables output 216B may be provided from early sample enable decoder 213A and late sample enable decoder 213B to the weighting bins 230A and 230B. Specifically, the early bin enables output 216A is provided from the early sample decoder 213A to input A of weighting bins 230A and 230B as depicted in FIG. 2A. Moreover, the late bin enables output 216B is provided from the late sample decoder 213B to input B of weighting bins 230A and 230B as depicted in FIG. 2A.

In an embodiment, the complex rotated samples 215A and 215B may be accumulated in a window that span at least 1.5 code chips, e.g., 2 code chips, to track the integrated signal.

Specifically, weighting bin 230A may store a weighting vector that may be utilized to generate a punctual (P) signal that may be utilized for tracking. In an implementation, the processor 125 may initialize weighting bin 230A such that the weighting bin 230A stores the weighting vector for the P signal. In an implementation, a value for the P signal for tracking may be generated as:

$$P_i = [(216A_i \cdot W_p) \times 215A_i + (216B_i \cdot W_p) \times 215B_i]$$

$$P = \sum_{i=0}^{T} P_i$$

where $w_P = [W_{b1}, W_{b2}, \ldots, W_{bN}]$, where $215A_i$ is the early complex rotated sample for sample i, $216A_i$ is the early bin enables output for sample i, $215B_i$ is the late complex rotated sample for sample i, $216B_i$ is the late bin enables output for sample i, $w_P$ is a weighting vector applied to the enabled sample, N is the total number of bins, and T is the number of samples to accumulate. The DOT product "●" is defined as the sum of the products of the corresponding entries of two vectors of equal length i.e., $$a \cdot b = \sum_{1}^{n} a_i b_i$$

where n is the lengths of vectors a and b.

The Summation portion of this equation may be performed in Adder 242. Thus, and in this example with 20 bins, $w_P$ may be a vector of length 20 and each weight value in $w_P$ may correspond to a different bin. For example, the first value in $w_P$ ($W_{b1}$) may be a weight for bin 0, the second value in $w_P$ ($W_{b2}$) may be a weight for bin 1, and so forth. The weights in $w_P$ may be based on a variety of different factors including, but not limited to, the particular type of integrated signal (e.g., ACE-BOC type I signal, an ACE-BOC type II signal, or an ACE-BOC type III signal), a power ratio of the integrated signal, an implementation of the integrated signal, etc.

Continuing with the example above, $P_i$ may be generated based on the formula above and by utilizing the early complex rotated sample 215A and early bin enables output 216A with the weight from $w_P$ that corresponds to bin 12 and by utilizing the late complex rotated sample 215B and the late bin enables output 216B with the weight from $w_P$ that corresponds to bin 17. The P, values may be summed (i.e., accumulated) in adder 242 to generate the P signal.

Additionally, weighting bin 230B may store a weighting vector that may be utilized to generate an early-late (E-L) signal that may be utilized for tracking. In an implementation, the processor 125 may initialize weighting bin 230B such that the weighting bin 230B stores the weighting vector for the E-L signal. In an implementation, a value (E-L$_i$) of the E-L signal for tracking may be generated as:

$$E - L_i = [(216A_i \cdot W_{E-L}) \times 215A_i + (216B_i \cdot W_{E-L}) \times 215B_i]$$

$$E - L = \sum_{i=0}^{T} E - L_i$$

where $$W_{E-L} = [W_{b1}, W_{b2}, \ldots, W_{bN}],$$

where 215A$_i$ is the early complex rotated sample for sample i, 216A$_i$ is the early bin enables output for sample i, 215B$_i$ is the late complex rotated sample for sample i, 216B$_i$ is the late bin enables output for sample i, $W_{E-L}$ is a weighting vector applied to the enabled sample, N is the total number of bins, and T is the number of samples to accumulate. The DOT product "●" is defined as the sum of the products of the corresponding entries of two vectors of equal length i.e., $$a \cdot b = \sum_{1}^{n} a_i b_i$$

where n is the lengths of vectors a and b.

Thus, and in this example with 20 bins, $W_{E-L}$ may be a vector of length 20 and each weight value in $w_{E-L}$ may correspond to a different bin. For example, the first value in $W_{E-L}$ ($W_{b1}$) may be a weight for bin 0, the second value in $W_{E-L}$ ($W_{b1}$) may be a weight for bin 1, and so forth. The weights in $w_{E-L}$ may be based on a variety of different factors including, but not limited to, the particular type of integrated signal (e.g., ACE-BOC type I signal, an ACE-BOC type II signal, or an ACE-BOC type III signal), a power ratio of the integrated signal, an implementation of the integrated signal, etc.

Continuing with the example above, the E-L, may be generated based on the formula above and by utilizing the early complex rotated sample 215A and the early bin enables output 216A with the weight from $w_{E-L}$ that corresponds to bin 12 and by utilizing the late complex rotated sample 215B and the late bin enables output 216B with the weight from $w_{E-L}$ that corresponds to bin 17. E-L, values that are calculated may be summed (i.e., accumulated) in adder 244 to generate the E-L signal. Therefore, adders 242, 244 accumulate (sum) the P, and E-L, values for some predetermined period of time to respectively generate P and E-L accumulated signals.

The P and E-L accumulated signals from 242 and 244 may be provided to a tracking module 252 as depicted in FIG. 2A, where the tracking module 252 may be external to the integrated signal processing unit 200. In an embodiment, the tracking module may include a code tracking loop 253 that may be a delay lock loop (DLL) that may operate in a conventional manner. In addition, the tracking module may include a carrier tracking loop 254 that may be a Phase Lock Loop (PLL) or Frequency Lock Loop (FLL), each of which may operate in a conventional manner.

In an implementation, the tracking module may calculate a code error signal (COde$_{Error}$) as:

$$\text{Code}_{Error} = \frac{I_P I_{E-L} + Q_P Q_{E-L}}{I_P^2 + Q_P^2} * \text{chipsize},$$

where $I_P$ and $Q_P$ are respectively in-phase and quadrature-phase components of punctual signal generated by Adder 242, $I_{E-L}$ and $Q_{E-L}$ are in-phase and quadrature-phase components of the E-L signal generated by Adder 244, and chipsize is a chip size that may be included in the calculation to normalize the code error value since various codes may have different chip sizes. The Code Error may be provided to the code tracking loop 253 (e.g., a DLL) that, in turn, provides new estimates of the code rate 205 for tracking purposes, as known by those skilled in the art. Although reference is made to calculating Code$_{Error}$ utilizing the formula above, it is expressly contemplated that the Code$_{Error}$ signal used to track the integrated signal may be calculated in any of a variety of different ways, as known by those skilled in the art.

Similarly, and according to the one or more embodiments described herein, the in-phase and quadrature-phase components of punctual signal generated by Adder 242 may be provided to and utilized by the carrier tracking loop 254 (e.g., PLL or FLL) to generate new estimates of the Carrier Doppler frequency 209, as known by those skilled in the art.

Figure 2B:
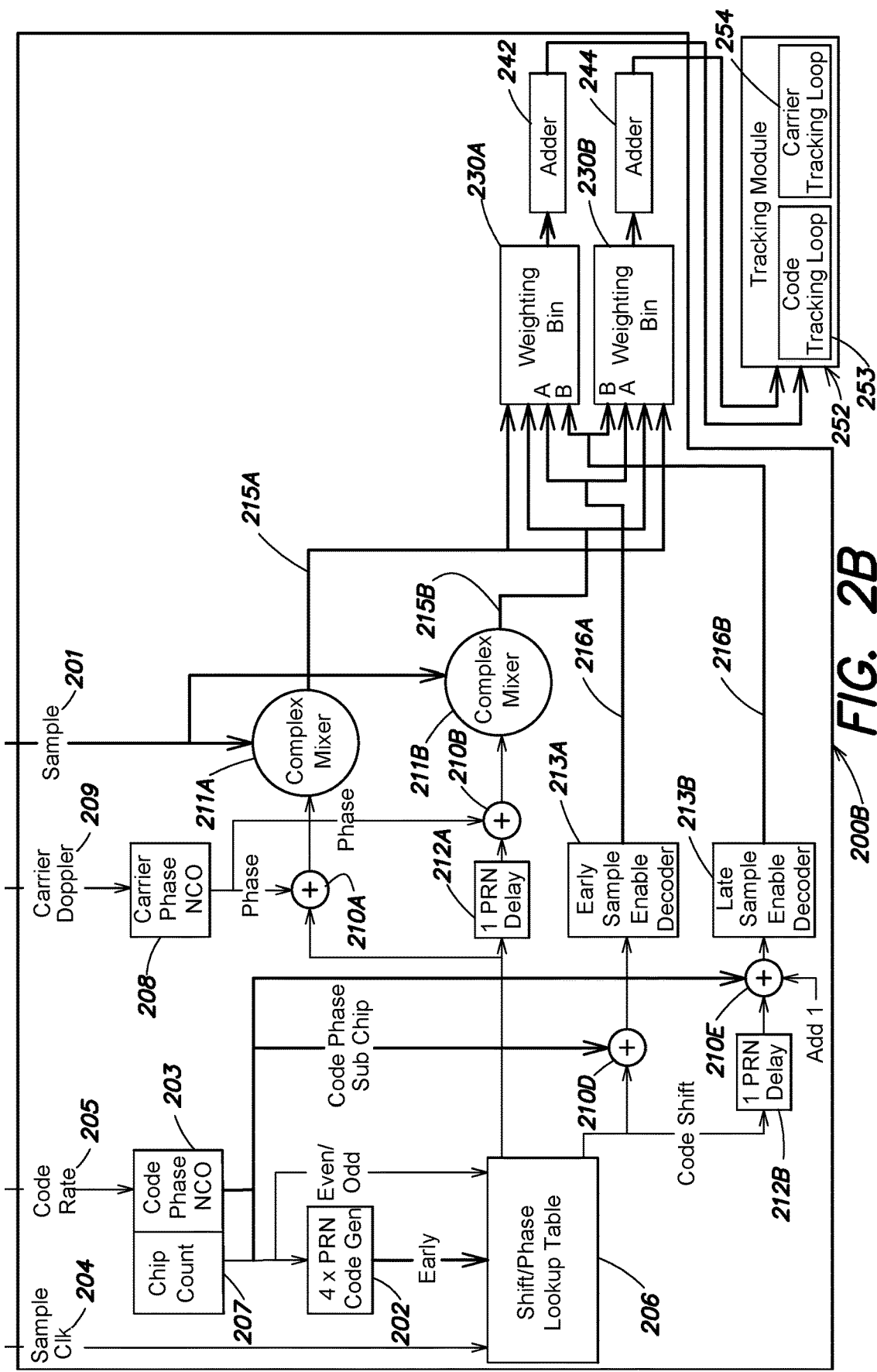
FIG. 2B is a schematic block diagram of another integrated signal processing unit that may process an integrated signal by generating complex rotated samples in parallel for a sample of the integrated signal according to one or more embodiments described herein.

FIG. 2B is a schematic block diagram of another integrated signal processing unit 200B that may process an integrated signal by generating complex rotated samples in parallel for a sample of the integrated signal 201, according to one or more embodiments described herein. FIG. 2B is similar to FIG. 2A, however integrated signal processing unit 200B does not include bins 220. As such, and as depicted in FIG. 2B, early and late complex rotated samples 215A and 215B generated in parallel for a sample 201 are provided to both the weighting bins 230A and 230B for tracking the integrated signal as described above. Although the integrated signal processing unit 200B of FIG. 2B does not include bins 220, the weighting bins 230A and 230B may be utilized to generate the accumulated P signal and the E-L signal as described above with reference to FIG. 2A. The accumulated P signal and the E-L signal may be provided to a tracking module 252 to calculate Code$_{Error}$, code Rate 205, and/or Carrier Doppler frequency 209 for tracking as described above with reference to FIG. 2A.

Figure 2C:
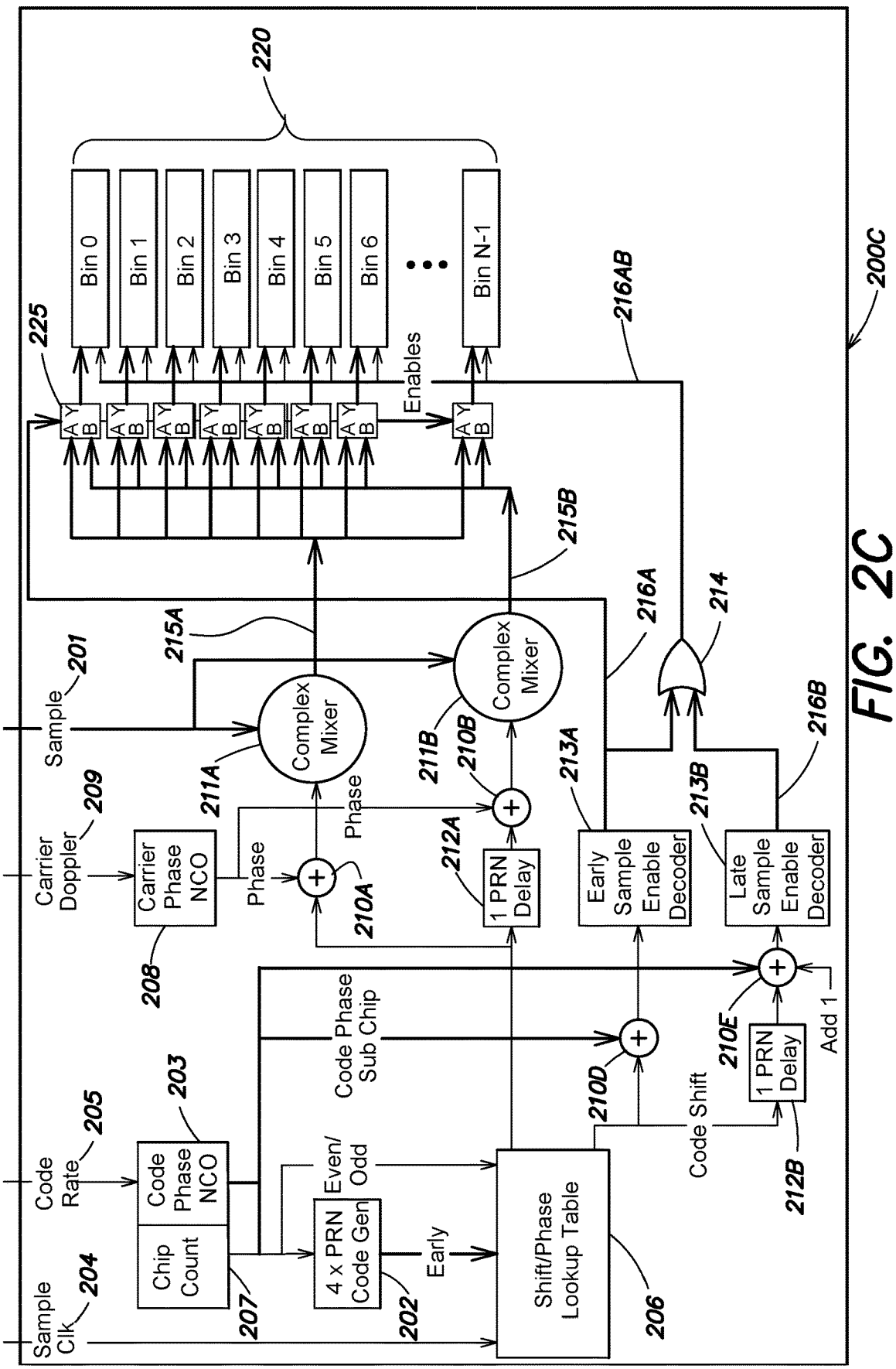
FIG. 2C is a schematic block diagram of another integrated signal processing unit that may process an integrated signal by generating complex rotated samples in parallel for a sample of the integrated signal according to one or more embodiments described herein

FIG. 2C is a schematic block diagram of another integrated signal processing unit 200C that may process an integrated signal by generating complex rotated samples 215A and 215B in parallel for a sample of the integrated signal according to one or more embodiments described herein. FIG. 2C is similar to FIG. 2A, however integrated signal processing unit 200C does not include weighting bins 230A and 230B and adders 242 and 244. As such, and integrated signal processing unit 200C of FIG. 2C may accumulate the complex rotated samples in selected bins 220 and/or selected groups of bins 220 as described above with reference to FIG. 2A, to produce correlation values that may be needed to perform one or more correlation techniques, and/or one or more multipath mitigation techniques, and/or one or more ways to generate Code Rate (e.g., DLL) and Carrier Doppler frequency estimates (e.g., PLL or FLL).

Figure 5:
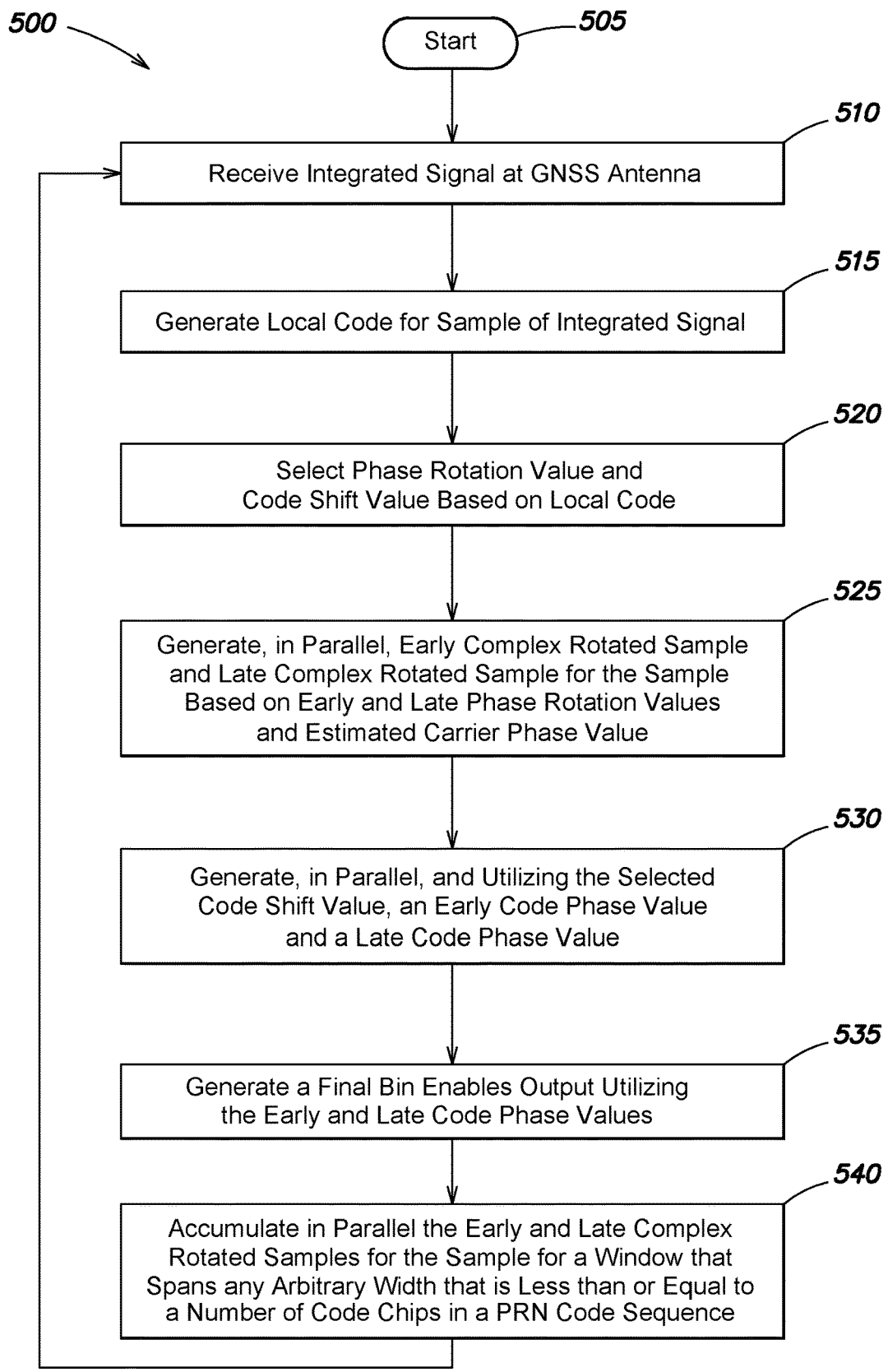
FIG. 5 is an exemplary flow chart for processing an integrated signal by generating complex rotated samples in parallel for a sample of the integrated signal according to one or more embodiments described herein.

FIG. 5 is an exemplary flow chart for processing an integrated signal by generating complex rotated samples in parallel for a sample of the integrated signal according to one or more embodiments described herein. The procedure 500 starts at step 505 and continues at step 510 where integrated signal is received at a GNSS antenna. In an embodiment, the integrated signal may be based on ACE-BOC multiplexing and may have a plurality of signal components with arbitrary power allocation.

The procedure continues to step 515 and a local code is generated for a sample 201 of the integrated signal, where the local code corresponds to one of the codes in the received integrated signal. In an implementation, the local code may be an early version of the code in the integrated signal. The procedure continues to step 520 and a phase rotation value and a code shift value are selected based on the local code. For example, the phase rotation value and the code shift value may be selected from a shift/phase lookup table 206 as described above with reference to FIG. 3.

The procedure continues to step 525 and an early complex rotated sample 215A and a late complex rotated sample 215B are generated in parallel based on the phase rotation values (e.g., early phase rotation value and the late phase rotation value from the 1 PRN delay 212A) and the carrier phase value estimated by the carrier phase NCO 208, as described above with reference to FIG. 2A. The procedure continues to step 530 and an early code phase value and a late code phase value are generated in parallel utilizing the early and late code shift values as described above with reference to FIG. 2A. In an embodiment, the late code shift value is the early code shift value offset in time by the period of 1 PRN code chip utilizing 1 PRN delay 212B, as described above with reference to FIG. 2A.

The procedure continues to step 535 and the early and late code phase values are utilized to generate a final bin enable output 216AB that may be a vector. As such, the final bin enables output vector spans at least 1.5 code chips (e.g., 2 code chips) since the early code phase value and late code phase value span at least 1.5 code chips (e.g., 2 code chips). The procedure continues to step 540 and the complex rotated samples (e.g., early and late complex rotated samples 215A and 215B) are accumulated in parallel for the single sample utilizing the final bin enables output 216AB generated for a window that spans any arbitrary width that is less than or equal to a number of code chips in a PRN code sequence. For example, the window may span at least 1.5 code chips (e.g., 2 code chips).

For example, the final bin enables output 216AB may be utilized to accumulate in parallel the early and late complex rotated samples in one or two bins (or no bins) of a plurality of bins 220 that span at least 1.5 code chips (e.g., 2 code chips). The plurality of bins 220 may be used to produce correlation values that may be needed to perform one or more correlation techniques and/or one or more multipath mitigation techniques and/or one or more Carrier Doppler frequency estimation techniques.

In addition or alternatively, the early bin enables output 216A and the late bin enables output 216B may be utilized to accumulate in parallel the early and late complex rotated samples 215A and 215B for the sample 201 utilizing weighting bins 230A and 230B for a window that span at least 1.5 code chips (2 code chips). The weighting bins 230A and 230B may be utilized to accumulate the signal for some predetermined period of time and then may be used for tracking both the Code and Carrier of the integrated signal providing corrected signals to the Code Rate 205 and Carrier Doppler frequency 209.

The procedure then reverts back to step 510 to repeat procedure 500 such that complex rotated samples can be generated and accumulated in parallel for a next sample of the integrated signal 201.

Figure 6A:
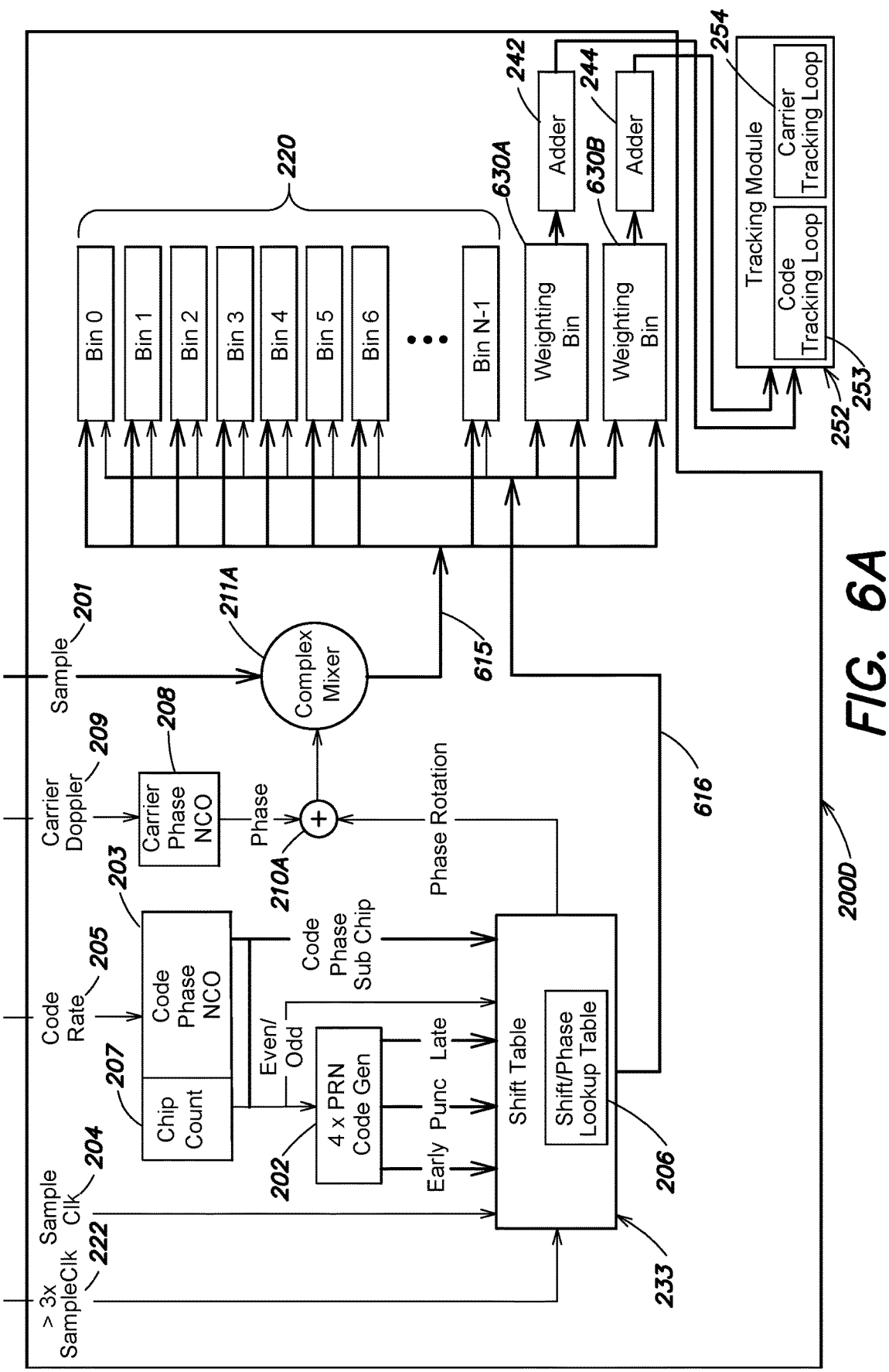
FIG. 6A is a schematic block diagram of an integrated signal processing unit that may process an integrated signal by sequentially generating complex rotated samples for a sample of the integrated signal according to one or more embodiments described herein.

In addition to generating and accumulating early and late complex rotated samples in parallel for each sample 201 as described above with reference to FIGS. 2A-2C, the one or more embodiments described herein may also sequentially generate and accumulate complex rotated samples 615 (e.g., early and/or late complex rotated samples 215A and 215B) for each sample 201. FIG. 6A is a schematic block diagram of an integrated signal processing unit 200D that may process an integrated signal by sequentially generating complex rotated samples 615 for a sample 201 of the integrated signal according to one or more embodiments described herein.

According to the one or more embodiments described herein and as will be described in further detail below with reference to FIG. 6A, samples of the integrated signal 201, taken in synchronism with a sample clock 204, may be processed by sequentially generating complex rotated samples (e.g., early, punctual, and late complex rotated samples) for each sample 201. The complex rotated samples 615 for the sample 201 may be sequentially accumulated in N bins 220 that span any arbitrary width that is less than or equal to a number of code chips in a PRN code sequence. For example, the window may span at least 1.5 code chips (e.g., 3 or 10 code chips).

As an illustrative example, let it be assumed that the bins 220 of FIG. 6A include 21 bins that are evenly spaced over the span of 3 code chips. In addition, let it be assumed that the first 7 bins (e.g., bin 0-bin 6) are "early bins" that span the first code chip, the second 7 bins (e.g., bin 7-bin 13) are "punctual bins" that span the second code chip, and the third 7 bins (e.g., bin 14-20) are "late bins" that span the third code chip.

As will be described in further detail below, an early complex rotated sample 615 may be generated for sample 201 and accumulated in a bin of the plurality of bins 220 that span 3 code chips. Then a punctual complex rotated sample may be generated for sample 201 and accumulated in a bin of the plurality of bins 220 that span 3 code chips. Then a late complex rotated sample may be generated for sample 201 and accumulated in a bin of the plurality of bins 220 that span 3 code chips. As such, the three complex rotated samples may be sequentially generated and sequentially accumulated for a single sample 201 in a window that spans 3 code chips according to the one or more embodiments described herein. Although the example of FIG. 6A includes evenly spaced bins 220 that span 3 code chips, it is expressly contemplated that the one or more embodiments as described may include bins 220 that are unevenly spaced and span any arbitrary width that is less than or equal to a number of code chips in a PRN code sequence. For example, the bins may span at least 1.5 code chips or more than 3 code chips (e.g., 10 code chips).

Referring to FIG. 6A, 4×PRN code generator 202 may generate a plurality of local codes (e.g., PRN code) that correspond to the codes in the received integrated signal. In an embodiment, the plurality of local codes may be an early version of the codes in the integrated signal, a punctual version of the codes in the integrated signal, and a late version of the codes in the integrated signal.

As explained above, the first bit (e.g., the most significant bit) of the 4 bit code may correspond to an upper frequency in-phase signal ($S_{UI}$) associated with the integrated signal. The second bit of the 4 bit code may correspond to a lower frequency in-phase signal ($S_{LI}$) associated with the integrated signal. The third bit of the 4 bit code may correspond to an upper frequency quadrature-phase signal ($S_{UQ}$) associated with the integrated signal. The fourth bit (e.g., the least significant bit) of the 4 bit code may correspond to a lower frequency quadrature-phase signal ($S_{LQ}$) associated with the integrated signal.

As depicted in FIG. 6A, the three locally generated codes are provided to the shift table 233. Additionally, and as depicted in FIG. 6A, a 3× sample clock 222 is provided to the shift table 233. As will be described in further detail below, the 3× sample clock 222 is provided such that a code shift value and a phase rotation value can be sequentially selected from the shift/phase lookup table 206 (of shift table 233) for each of the early, punctual, and late versions of the code for the sample 201. Additionally, and similar to the initialization of the shift/phase lookup table 206 (of shift table 233) as described above, the processor 125 of the GNSS receiver 120 may also initialize the shift table 233.

Figure 7A:
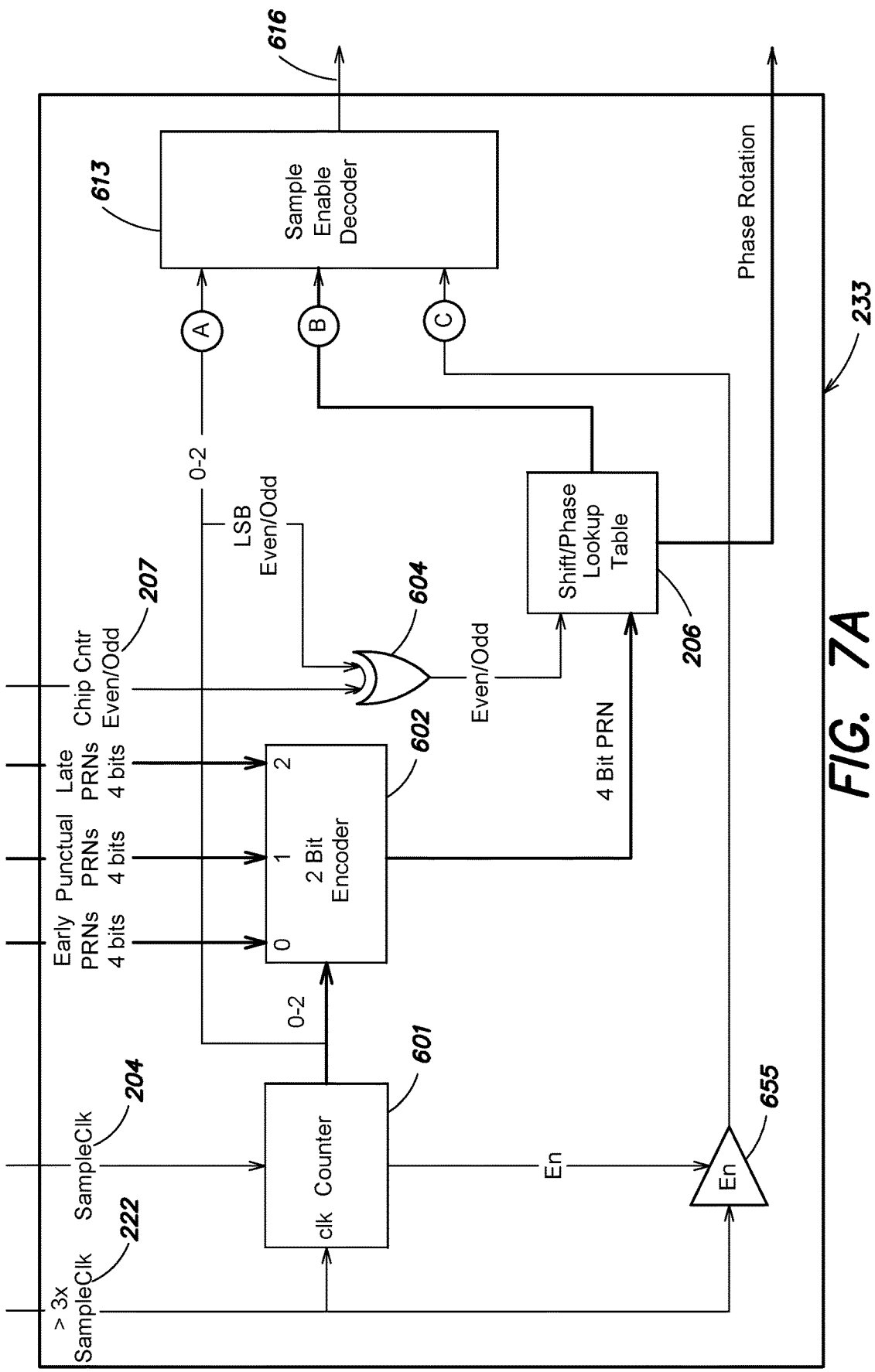
FIG. 7A and is a schematic block diagram of shift table according to the one or more embodiments described herein.

FIG. 7A is a schematic block diagram of shift table 233 according to the one or more embodiments described herein. As depicted in FIG. 7A, the 3× sample clock 222 is provided as input to the counter 601 of shift table 233. As such, the counter 601 may sequentially generate (i.e., generate in series) three different values (e.g., 0, 1, and 2) for the sample 201 (of FIG. 6A). The counter 601 starts at 0, increments to 1, increments to 2, and then resets back to 0 for a next sample 201 such that three different counter values are sequentially generated for each sample 201 based on the 3× sample clock 222.

The value of the counter 601 may determine which version of the local code (e.g., early version, punctual version, or the late version) is provided for the sample 201 to the shift/phase lookup table 206 as depicted in FIG. 7A. For example, and when the counter 601 generates a value of 0, the value of 0 is provided as input to 2 bit encoder 602 that generates a binary value of 00. In response to the generation of a binary value of 00 by the 2 bit encoder 602, the early version of the local code may be provided to the shift/phase lookup table 206 for the sample 201. As such, a phase rotation value and code shift value may be selected from the phase/shift lookup table 206, as described above with reference to FIG. 3, for the early version of the local code.

When the counter 601 increments to a value of 1, the value of 1 is provided as input to 2 bit encoder 602 that generates a binary value of 01. In response to the generation of a binary value of 01 by the 2 bit encoder 602, the punctual version of the local code may be provided to the phase/shift lookup table 206 for the sample 201. As such, a phase rotation value and code shift value may be selected from the phase/shift lookup table 206, as described above with reference to FIG. 3, for the punctual version of the local code.

When the counter 601 increments to a value of 2, the value of 2 is provided as input to 2 bit encoder 602 that generates a binary value of 10. In response to the generation of a binary value 10 by the 2 bit encoder 602, the late version of the local code may be provided to the phase/shift lookup table 206 for the sample 201. As such, a phase rotation value and code shift value may be selected from the phase/shift lookup table 206, as described above with reference to FIG. 3, for the late version of the local code.

Additionally, and as depicted in FIG. 7A, the output from XOR gate 604 is also provided as input to the phase/shift lookup table 206 to indicate whether the code chip is even or odd in a similar manner as described above with reference to FIG. 3. Specifically, the output of counter 601, e.g., the least significant bit of the output of counter 601, may be provided to XOR gate 604. Because the plurality of bins span 3 code chips in this example, the least significant bit of the counter 601 may be utilized in conjunction with the least significant bit of the chip count 207 to indicate whether the code chip is even or odd. More specifically, the least significant bit of the counter 601 and the least significant bit of the chip count 207 may be provided to XOR gate 604. The output of XOR gate 604 may be provided to the shift/phase lookup table 206 to indicate whether the code chip is even or odd, such that the selected phase rotation value from the shift/phase lookup table can be adjusted 180 degrees for odd chips as described above with reference to FIG. 3.

Therefore, and for a single sample 201, three pairs of a phase rotation values and code shift values are sequentially generated from shift/phase lookup table 206 based on the three versions of the local code (e.g., early, punctual, or late version of the code). As will be described in further detail below, the phase rotation value of a selected pair may be utilized in addition to the carrier phase value estimated by the carrier phase NCO 208 to generate a complex rotated sample 615 while the code phase value (B) of the selected pair may be utilized to generate a bin enables output 616 that, in turn, enable a bin of the plurality of bins 220 that span 3 code chips.

Figure 7B:
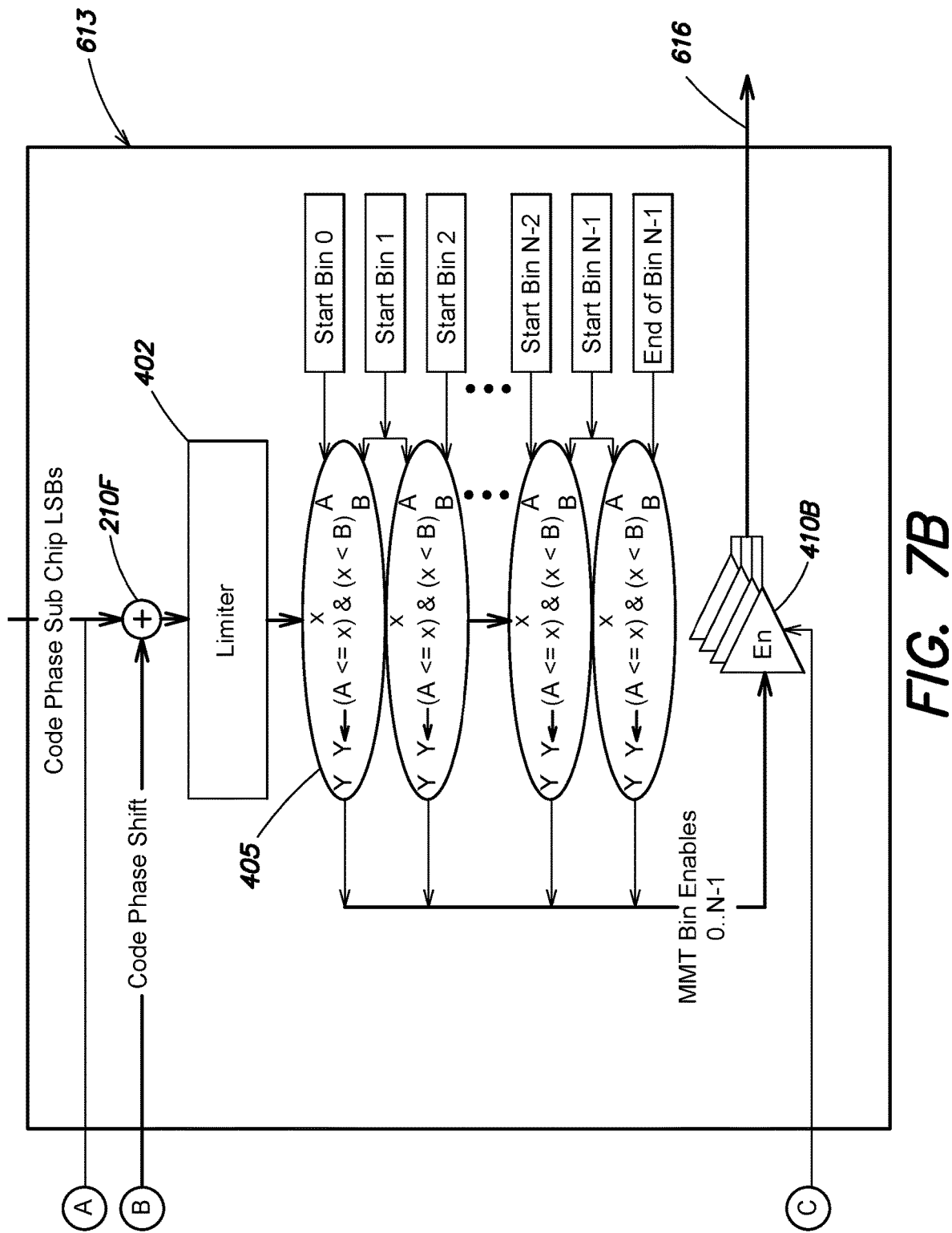
FIG. 7B is a schematic block diagram of a sample enable decoder according to the one or more embodiments described herein.

Specifically, each code phase value (B), of each pair, may be provided from the shift/phase lookup table 206 to adder 210F of the sample enable decoder 613 as depicted in FIG. 7B that is a schematic block diagram of the sample enable decoder 613 according to the one or more embodiments described herein. Additionally, the value from counter 601 (A) may be combined as the two most significant bits to the code phase sub chip value that is provided by the code phase NCO 203 and that represents the time slot in the code chip for the sample 201. The value of the counter 601 may be combined as the two most significant bits to offset the selected code phase in time when appropriate.

When the counter 601 is a value of 0 and the early version of the local code is provided to the shift/phase lookup table 206, "00" (representing the value of 0) are combined as the two most significant bits of the code phase sub chip value. Because "00" are combined as the two most significant bits, the selected code shift value (of the pair corresponding to the early version of the code) is not offset in time when the adder 210F, of the sample enable decoder 613, adds the code phase sub chip value to the selected code shift value. The output of the adder 210F may be an early sample code phase value.

When the counter is a value of 1 and the punctual version of the local code is provided to the shift/phase lookup table 206, "01" (representing the value of 1) are combined as the two most significant bits of the code phase sub chip value. Because "01" are combined as the two most significant bits, the selected code shift value (of the pair corresponding to the punctual version of the code) is offset in time by 1 PRN chip worth of code phase when the adder 210F, of the sample enable decoder 613, adds the combined value to the selected shift phase value (i.e., for the second code chip of the window that spans 3 code chips). The output of the adder 210F may be a punctual sample code phase value.

When the counter is a value of 2 and the late version of the local code is provided to the shift/phase lookup table 206, "10" are combined as the two most significant bits of the code phase sub chip value. Because "10" are combined as the two most significant bits, the selected code shift value (of the pair corresponding to the late version of the code) is offset in time by 2 PRN chip worth of code phase when the adder 210F, of the sample enable decoder 613, adds the combined value to the selected code shift value (i.e., for the third code chip of the window that spans 3 code chips). The output of the adder 210F may be a late sample code phase value.

The sample code phase values (e.g., early, punctual, and late code phase values) may be utilized by each of the plurality of comparators 405, of the sample enable decoder 613 of FIG. 7B, to sequentially determine which bin, of bins 220 that span 3 code chips, is enabled as described above with reference to FIG. 4. In an implementation, a sample code phase value (e.g., early, punctual, or late code phase value) may enable an early bin, e.g., one of bins 0-6, when the sample code phase value is less than 1.0. In an implementation, a sample code phase value (e.g., early, punctual, or late code phase value) may enable a punctual bin, e.g., one of bins 7-13, when the sample code phase value is greater than 1.0 and less than 2.0. In an implementation, a sample code phase value (e.g., early, punctual, or late code phase value) may enable a late bin, e.g., one of bins 8-20, when the sample code phase value is greater than 2.0.

Specifically, the early sample code phase value may be utilized by each of the 21 comparators 405, each comparator producing a bit of the bin enables output 616 (e.g., vector of 0's and 1's) as described above with reference to signals 216A in FIG. 4. The bin enables output 616 may be utilized to enable a bin such that an early complex rotated sample, generated for the sample 201 as described below, is accumulated in the enabled bin.

Similarly, the punctual sample code phase value may be utilized by each of the 21 comparators 405, each comparator producing a bit of the enables output 616 (e.g., vector of 0's and 1's) as described above with reference to signal 216B of FIG. 4. The bin enables output 616 may be again utilized to enable a bin such that a punctual complex rotated sample, generated for the sample 201 as described below, is accumulated in the enabled bin. Further, the late sample code phase value may be utilized by each of the 21 comparators 405, each comparator producing a bit of the bin enables output 616 (e.g., vector of 0's and 1's) as described above. The bin enables output 616 may again be utilized to enable a bin such that a late complex rotated sample, generated for the sample 201 as described below, is accumulated in the enabled bin.

Referring back to FIG. 6A, a phase rotation value and a bin enables output 616 are sequentially provided as output from shift table 233 based on each version of the local code for the sample 201. For the early version of the code, the phase rotation value generated from the shift/phase lookup table 206 and the early bin enables output 616 are provided as output from the shift table 233. For the punctual version of the code, the phase rotation value generated from the shift/phase lookup table 206 and the punctual bin enables output 616 are provided as output from the shift table 233. For the late version of the code, the phase rotation value generated from the shift/phase lookup table 206 and the late bins enable output 616 are provided as output from the shift table 233.

The bin enables outputs (e.g., early, punctual, and late bin enables outputs) may be sequentially provided from enabler 410B to form signal bin enables output 616 (of shift table 233 of FIG. 7B) that is connected to bins 220 of FIG. 6A to sequentially enable a bin as described above with reference to FIG. 2A. Specifically, and because enabler 655 receives as input the 3× sample clock 222 and an enable signal from the counter 601, enabler 655 provides a signal (C) to enabler 410B and enabler 410B sequentially provide the bin enables output 616 (e.g., the three values corresponding to early, punctual, and late bin enable outputs) to sequentially enable, for a single sample 201, three bins of bins 220 that span 3 code chips.

Each phase rotation value output from the shift table 233 may be utilized to generate a complex rotated sample 615. Specifically, each phase rotation value may be provided with the carrier phase value estimated by the carrier phase NCO 208 to adder 210A to remove the Doppler effect as described above with reference to FIG. 2A. The result of the addition may be provided to complex mixer 211A and mixed with the sample 201 (e.g., multibit I and Q sample) to obtain the complex rotated sample 615 as described above with reference to signal 215A and 216B of FIG. 2A.

For example, the phase rotation value, generated based on the early version of the code, may be utilized to generate an early complex rotated sample 615 for the sample 201. The phase rotation value, generated based on the punctual version of the code, may be utilized to generate a punctual complex rotated sample 615 for the sample 201. The phase rotation value, generated based on the late version of the code, may be utilized to generate a late complex rotated sample 615 for the sample 201.

As such, the integrated signal processing unit 200D may sequentially generate complex rotated samples for a single sample 201, where the complex rotated samples may be sequentially accumulated in bins 220 that span 3 code chips. Specifically, the generated early complex rotated sample may be accumulated in a bin, of bins 220 that span 3 code chips, that is enabled based on early bin enables data in the bin enables output 616. The generated punctual complex rotated sample may then be accumulated in a bin, of bins 220 that span 3 code chips, that is enabled based on punctual bin enables data in the bins enable output 616. The generated late complex rotated sample may then be accumulated in a bin, of bins 220 that span 3 code chips, that is enabled based on the late bin enables data in the bin enables output 616. As such, the early, punctual, and late complex rotated samples that are generated for a single sample 201 may be sequentially generated and accumulated in enabled bins that span 3 code chips according to one or more embodiments described herein.

More generally, each bin of 220 generates its signal using the following formula:

$$Bin_j = \sum_{i=0}^{T}\left\{\sum_{k=0}^{K}[(616_{ik} \cdot IT_j) \times 615_{ik}]\right\}$$

where $IT_j$ is a binary vector (0s and 1s) for bin j of length N that contains all 0s except for a 1 in the j position, N is the total number of bins, k is the chip offset (output of counter 601 where the chip offset is 0, 1, or 2 in this example), where each chip offset k is processed at the sample clock rate 222. Additionally, K is the number of chips in the sequential process (in this example K=3), T is the number of samples to accumulate, $616_{ik}$ is the bin enables output for sample i and chip offset k, and $615_{ik}$ is the complex rotated for sample i and chip offset k. The DOT product "●" is defined as the sum of the products of the corresponding entries of two vectors of equal length i.e., $$a \cdot b = \sum_{1}^{n} a_i b_i$$

where n is the lengths of vectors a and b.

Thus, and according to one or more embodiments described herein, a plurality of samples of the integrated signal, taken in synchronism with sample clock 204, may be processed by sequentially generating early, punctual, and late complex rotated samples for each sample 201 and accumulating the complex rotated samples in the plurality of bins 220 that span 3 code chips. The GNSS 120 receiver may use the complex rotated samples accumulated in selected bins 220 and/or selected groups of bins 220, to produce correlation values that may be needed to perform one or more correlation techniques and/or one or more multipath mitigation techniques and/or Carrier Doppler frequency estimation techniques.

Additionally, the complex rotated samples may be utilized to, for example, calculate correlation measurements utilizing weighting bins 630A and 630B.

Specifically, weighting bin 630A may store a weighting vector that may be utilized to generate the P signal that may be utilized for tracking. In an implementation, $P_{ik}$ for the P signal for tracking of FIG. 6A may be generated as:

$$P_{ik} = 615_{ik} \times (616_{ik} \cdot w_P)$$

$$P = \sum_{i=0}^{T}\sum_{k=0}^{K} P_{ik}$$

where $$W_P = [W_{b1}, W_{b2}, \ldots, W_{bN}],$$

where $615_{ik}$ is the complex rotated sample for sample i, $616_{ik}$ is the bin enables output for sample i and chip offset k, K is the number of chips in the sequential process (in this example K=3), T is the number of samples to accumulate, $w_p$ is a weighting vector applied to the enabled sample, and N is the total number of bins. The DOT product "●" is defined as the sum of the products of the corresponding entries of two vectors of equal length i.e., $$a \cdot b = \sum_{1}^{n} a_i b_i$$

where n is the lengths of vectors a and b.

Thus, and in this example with 21 bins, $w_p$ may be a vector of length 21 and each weight value in $w_p$ may correspond to a different bin. For example, the first value in $w_p$ ($W_{b1}$) may be a weight for bin 0, the second value in $w_p$ ($W_{b2}$) may be a weight for bin 1, and so forth. The weights in $w_p$ may be based on a variety of different factors including, but not limited to, the particular type of integrated signal (e.g., ACE-BOC type I signal, an ACE-BOC type II signal, or an ACE-BOC type III signal), a power ratio of the integrated signal, an implementation of the integrated signal, etc. The $P_i$ values may be summed in adder 242 to generate the P signal.

Additionally, weighting bin 630B of FIG. 6A may store a weighting vector that may be utilized to generate the E-L signal that may be utilized for tracking. In an implementation, $E\text{-}L_{ik}$ of the E-L signal for tracking may be generated as:

$$E - L_{ik} = 615_{ik} \times (616_{ik} \cdot w_{E-L}),$$

$$E - L = \sum_{i=0}^{T}\sum_{k=0}^{K} E - L_{ik}$$

where $$W_{E-L} = [W_{b1}, W_{b2}, \ldots, W_{bN}],$$

where $615_{ik}$ is the complex rotated sample for sample i, $616_{ik}$ is the bin enables output for sample i and chip offset k, K is the number of chips in the sequential process (in this example K=3), T is the number of samples to accumulate, $w_{E-L}$ is a weighting vector applied to the enabled sample, and N is the total number of bins. The DOT product "●" is defined as the sum of the products of the corresponding entries of two vectors of equal length i.e., $$a \cdot b = \sum_{1}^{n} a_i b_i$$

where n is the lengths of vectors a and b.

Thus, and in this example with 21 bins, $w_{E-L}$ may be a vector of length 21 and each weight value in $w_{E-L}$ may correspond to a different bin. For example, the first value in $w_{E-L}$ ($W_{b1}$) may be a weight for bin 0, the second value in $w_{E-L}$ ($W_{b2}$) may be a weight for bin 1, and so forth. The weights in $w_{E-L}$ may be based on a variety of different factors including, but not limited to, the particular type of integrated signal (e.g., ACE-BOC type I signal, an ACE-BOC type II signal, or an ACE-BOC type III signal), a power ratio of the integrated signal, an implementation of the integrated signal, etc. The E-L, values may be summed in adder 242 to generate the E-L signal.

The P and/or E-L signals may be utilized by code tracking loop 253 and carrier tracking loop 254 as described above with reference to FIG. 2A.

Figure 6B:
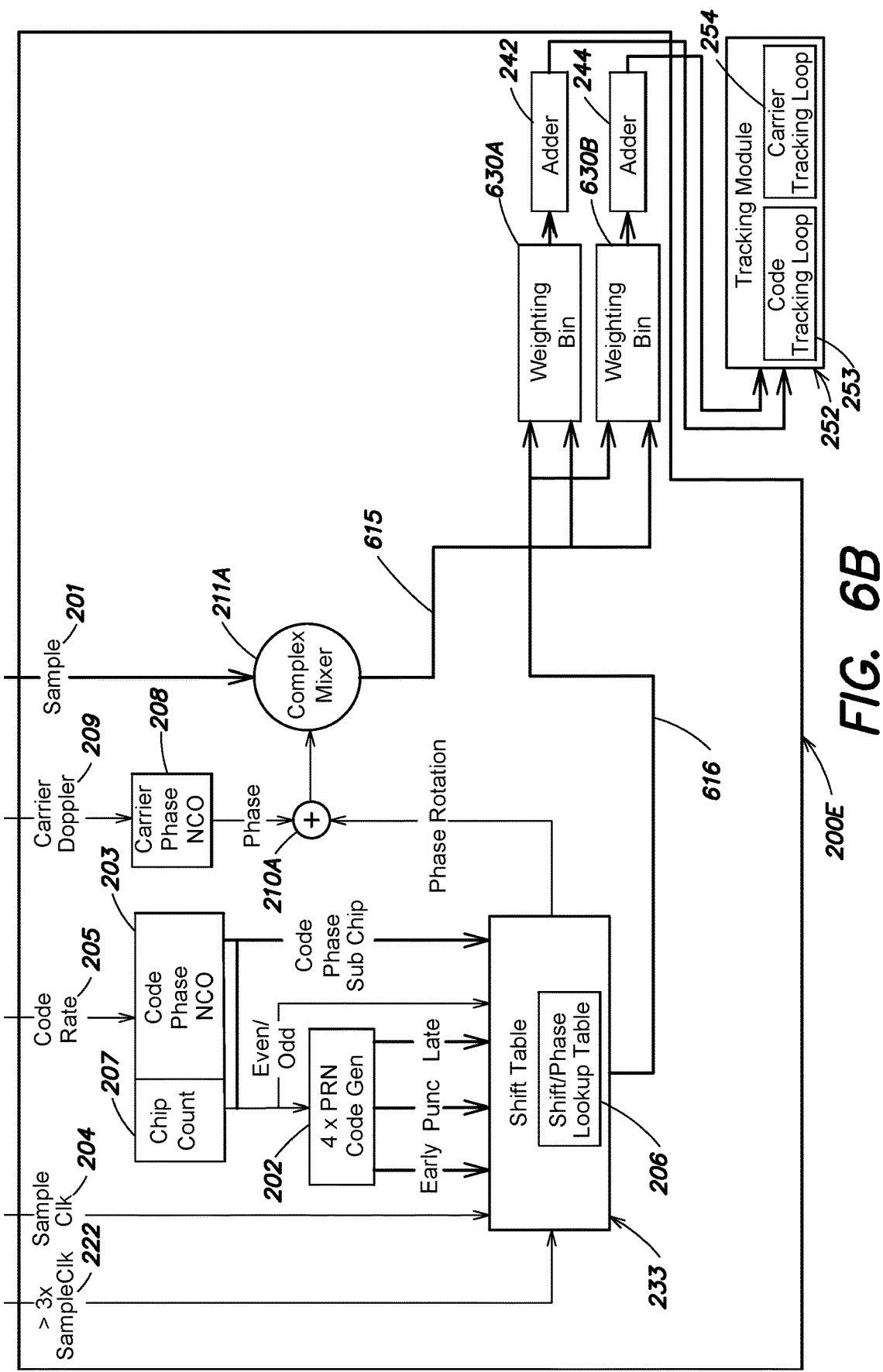
FIG. 6B is a schematic block diagram of another integrated signal processing unit that may process an integrated signal by sequentially generating complex rotated samples for a sample of the integrated signal according to one or more embodiments described herein

FIG. 6B is a schematic block diagram of an integrated signal processing unit that 200E may process an integrated signal by sequentially generating complex rotated samples for a sample of the integrated signal according to one or more embodiments described herein. FIG. 6B is similar to FIG. 6A, however integrated signal processing unit 200E does not include bins 220. As such, and as depicted in FIG. 6B, the complex rotated samples (e.g., early, punctual, and late complex rotated samples) that are generated in series for the sample 201 are provided to both the weighting bins 630A and 630B for tracking the integrated signal as described above. Although the integrated signal processing unit 200E of FIG. 6B does not include bins 220, the weighting bins 630A and 630B may be utilized to sequentially formulate the complex rotated sample vector (e.g., early, punctual, and late complex rotated samples) to generate the accumulated P signal and the E-L signal as described above with reference to FIG. 6A. The accumulated P signal and the E-L signal may be provided to a tracking module 252 to calculate $Code_{Error}$ for tracking the integrated signal and/or the tracking module 252 may utilize the punctual signal to generate new estimates of the Carrier Doppler frequency 209, as described above with reference to FIG. 2A.

Figure 6C:
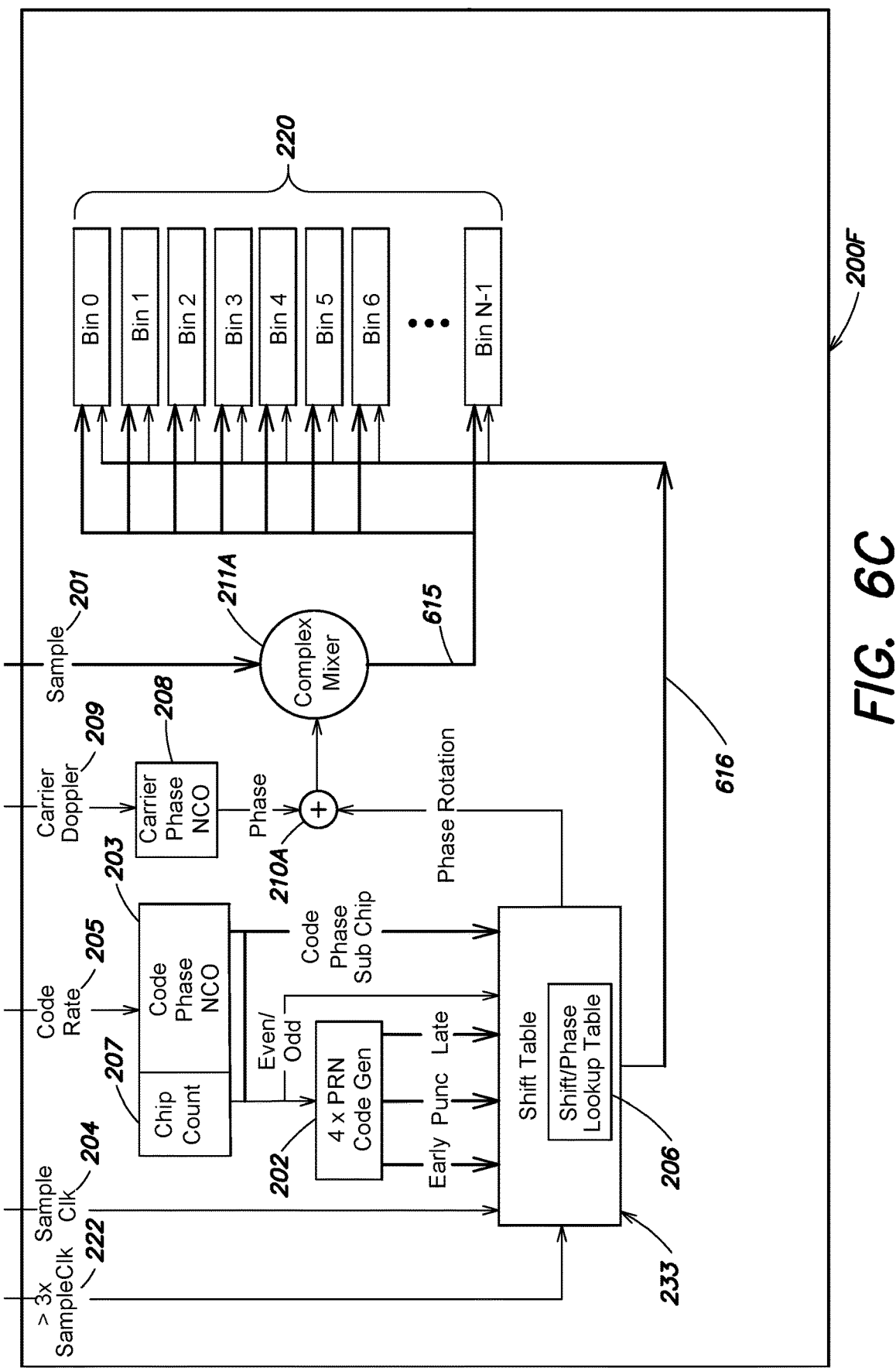
FIG. 6C is a schematic block diagram of an integrated signal processing unit that may process an integrated signal by sequentially generating complex rotated samples for a sample of the integrated signal according to one or more embodiments described herein.

FIG. 6C is a schematic block diagram of an integrated signal processing unit that 200F may process an integrated signal by sequentially generating complex rotated samples 615 for a sample of the integrated signal according to one or more embodiments described herein. FIG. 6C is similar to FIG. 6A, however integrated signal processing unit 200F does not include weighting bins 630A and 630B and adders 242 and 244. As such, the integrated signal processing unit 200F of FIG. 6C may sequentially generate and accumulate the early, punctual, and late complex rotated samples 615 for a single sample 201 in selected bins 220 and/or selected groups of bins 220 as described above with reference to FIG. 6A. The bins 220 may be used to produce correlation values that may be needed to perform one or more correlation techniques and/or one or more multipath mitigation techniques and/or Carrier Doppler frequency estimation techniques.

Figure 8:
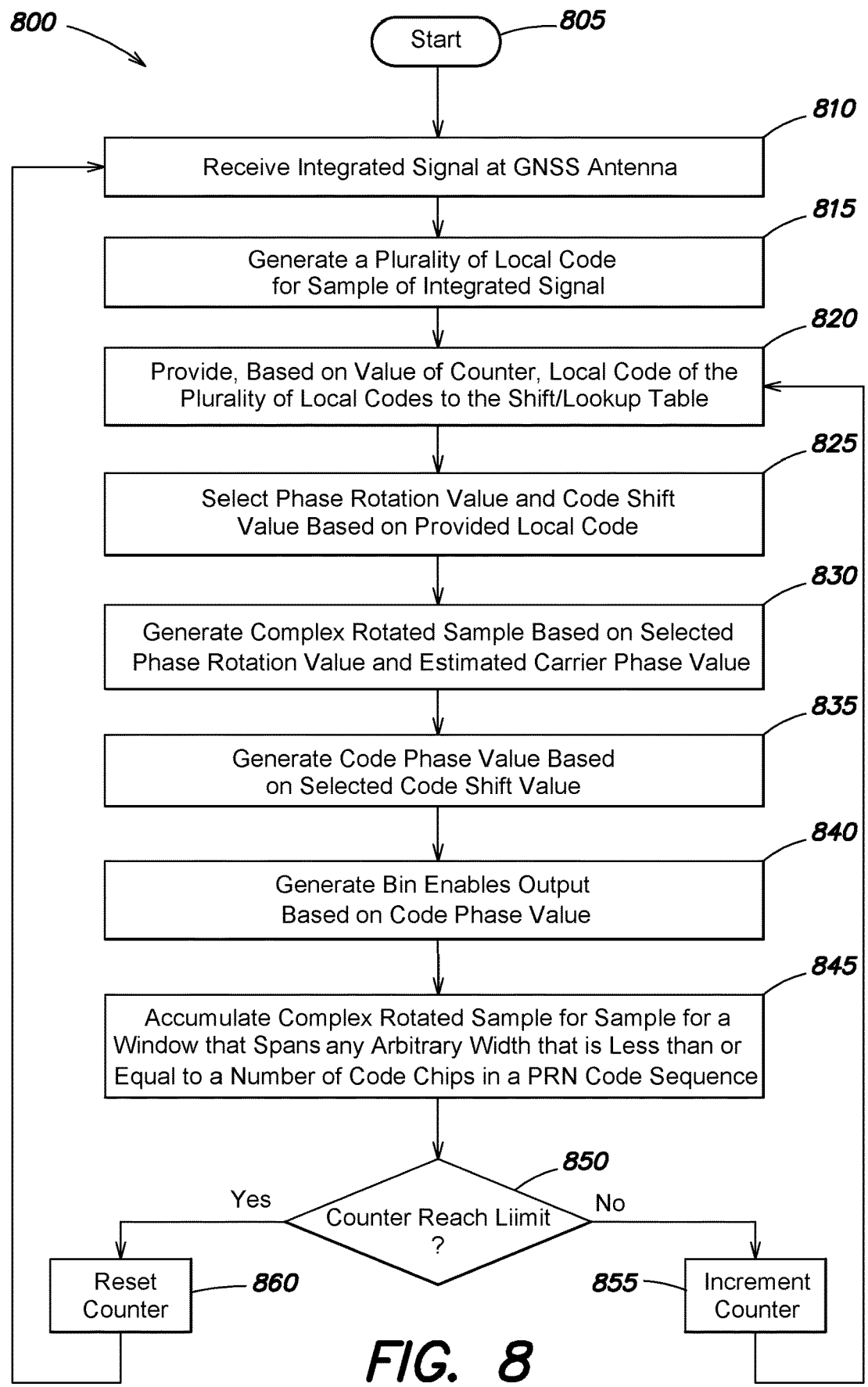
FIG. 8 is an exemplary flow chart for processing an integrated signal by sequentially generating complex rotated samples for a sample of the integrated signal according to the one or more embodiments described herein.

FIG. 8 is an exemplary flow chart for processing an integrated signal by sequentially generating complex rotated samples for a sample of the integrated signal according to one or more embodiments described herein. The procedure 800 starts at step 805 and continues at step 810 where an integrated signal is received at a GNSS antenna. In an embodiment, the integrated signal may be based on ACE-BOC multiplexing and may have a plurality of signal components with arbitrary power allocation.

The procedure continues to step 815 and a plurality of local codes (PRN codes) are generated for a sample 201 of the integrated signal, where the local codes correspond to the codes in the received integrated signal. In an implementation, the local codes may be an early version of the code in the integrated signal, a punctual version of the code in the integrated signal, and a late version of the code in the integrated signal.

The procedure continues to step 820 and a local code, of the plurality of local codes, is provided to a shift/phase lookup table. For example, and with reference to FIG. 6A, a counter value of 0 is generated by counter 601 which may cause the early version of the code to be provided to the shift/phase lookup table 206 for the sample 201.

The procedure continues to step 825 and a phase rotation value and a code shift value are selected based on the provided local code as described above with reference to FIGS. 6A, 7A, and 7B. The procedure continues to step 830 and a complex rotated sample is generated utilizing the selected phase rotation value and the carrier phase value estimated by the carrier phase NCO 208. For example, an early complex rotated sample may be generated utilizing the phase rotation value that is selected based on the early version of the code as described above with reference to FIGS. 6A, 7A, and 7B.

The procedure continues to step 835 and a code phase value is generated based on the selected code shift value and by offsetting the selected code shift value in time based on the value of the counter such that the window spans any arbitrary width that is less than or equal to a number of code chips in a PRN code sequence. For example, the window may span at least 1.5 code chips (e.g., 3 code chips or 10 code chips). For example, the code shift value selected based on the early version of the code may not be offset in time because the counter has a value of 0. As such, the selected code shift value may be added to the code phase sub chip value to generate the early code phase value. However, and as described above with reference to FIGS. 6A, 7A, and 7B, the code shift value selected based on the late version of the code may be offset in time by 2 PRN chip worth of code phase because the counter is a value of 2. As such, "10" are combined as the two most significant bits of the code phase sub chip value, and the combined value is added with the selected code shift value to generate to late code phase value.

The procedure continues to step 840 and a bin enables output 616 is generated based on the code phase value. For example, an early bin enables output 616 may be determined utilizing the early code phase value as described above with reference to FIGS. 6A 7A, and 7B.

The procedure continues to step 845 and the complex rotated sample 615 is accumulated for the single sample utilizing the bin enables output 616 for a window that spans any arbitrary width that is less than or equal to a number of code chips in a PRN code sequence. For example, the window may span at least 1.5 code chips (e.g., 3 code chips or 10 code chips). For example, the complex rotated sample 615 may be accumulated in a bin of a plurality of bins 220 that span at least 1.5 code chips (e.g., 3 code chips or 10 code chips) utilizing the bin enables output 616. In addition or alternatively, the complex rotated samples may be accumulated utilizing weighting bins 630A and 630B for a window that span at least 1.5 code chips (e.g., 3 code chips) utilizing the bin enables output 616. The weighting bins 630A and 630B may be utilized to accumulate the signal for some predetermined period of time and then may be used for tracking both the Code and Carrier of the integrated signal providing corrected signals to the Code Rate 205 and Carrier Doppler frequency 209.

The procedure continues to step 850 and it is determined whether the counter has reached a limit. If the counter has not reached the limit, the counter is incremented at step 855 and the procedure then reverts back to 820 such that integrated signal processing unit (e.g., 200D-F) can sequentially generate complex rotated samples 615 for the sample 201. For example, the procedure may revert back to step 820 to generate and accumulate a punctual complex rotated sample based on a code shift value and a phase rotation value selected based on the punctual version of the code as described above. The procedure may then again revert back revert back to step 820 to generate and accumulate a late complex rotated sample based on a code shift value and a phase rotation value selected based on the late version of the code as described above. Accordingly, the early, punctual, and late complex rotated samples are sequentially generated and accumulated for a single sample 201 for a window that spans any arbitrary width that is less than or equal to a number of code chips in a PRN code sequence, e.g., at least 1.5 code chips (3 code chips or 10 code chips).

If at step 850 the counter has reached the limit, the counter may be reset at step 860 and the procedure may revert back to step 810 such that complex rotated samples (e.g., early, punctual, and late complex rotated samples) may be sequentially generated and accumulated for a next sample 201.

Advantageously, GNSS receiver 105 may use the complex rotated samples 615 that are sequentially generated and accumulated in selected bins 220 and/or selected groups of bins 220, to produce correlation values that may be needed to perform one or more correlation techniques, and/or one or more multipath mitigation techniques, and/or Carrier Doppler frequency estimation techniques. In addition or alternatively, the complex rotated samples 615 sequentially generated can be used by weighting bins 630A and 630B to produce correlation values that may be utilized to track the integrated signal.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer. The computer-executable instructions may include instructions that implement one or more embodiments described herein. The tangible non-transitory computer-readable storage media may be volatile or non-volatile and may include, for example, flash memories, dynamic memories, removable disks, and non-removable disks. Above all, it should be understood that the above description is meant to be taken only by way of example.

The invention claimed is:

1. A navigation receiver, comprising:
   for an integrated signal with a plurality of signal components with arbitrary power allocation among the plurality of signal components;
   an integrated signal processing unit executed by a processor, the integrated signal processing unit configured to:
   generate at least one local code for a sample of the integrated signal;
   select, for each local code of the at least one local code, a phase rotation value and a code shift value;
   generate, based on the phase rotation value, one or more complex rotated samples for the sample; and
   determine, based on the code shift value, one or more time slots of a plurality of time slots for a window that spans at least a portion of a pseudorandom noise (PRN) period.

2. The navigation receiver of claim 1, wherein the integrated signal processing unit is further configured to:
   enable one or more bins, of a plurality of bins that span the portion of the PRN period, utilizing the code shift value, and
   wherein accumulated complex rotated samples in the plurality of bins are utilized by the GNSS receiver to perform at least one of (1) one or more correlation techniques, (2) one or more multipath mitigation techniques, (3) one or more Carrier Doppler frequency estimation techniques.

3. The navigation receiver of claim 1, wherein the integrated signal processing unit is further configured to:
   utilize one or more weighting vectors with at least the one or more complex rotated samples to generate at least one of a punctual signal and an early minus late signal, wherein the punctual signal and early minus late signal are utilized for tracking the integrated signal.

4. The navigation receiver of claim 1, wherein the integrated signal is based on Asymmetric Constant Envelope Binary Offset Carrier (ACE-BOC) multiplexing.

5. The navigation receiver of claim 1, wherein the at least one local code corresponds to one or more of (1) an early version of a code in the integrated signal, (2) a punctual version of the code in the integrated, and (3) a late version of the code in the integrated signal.

6. The navigation receiver of claim 1, wherein the at least one local code is a single local code, and wherein the one or more complex rotated samples include an early complex rotated sample and a late complex rotated sample that are generated in parallel.

7. The navigation receiver of claim 1, wherein the at least one local code includes three local codes, and wherein the one or more complex rotated samples include an early complex rotated sample, a punctual complex rotated sample, and a late complex rotated sample that are sequentially generated.

8. A method for processing an integrated signal received at an antenna, wherein the integrated signal has a plurality of signal components with arbitrary power allocation, the method comprising:
   generating at least one local code for a sample of the integrated signal;
   selecting, for each local code of the at least one local code, a phase rotation value and a code shift value;
   generating, based on the phase rotation value, one or more complex rotated samples for the sample; and
   determining, based on the code shift value, one or more time slots of a plurality of time slots for a window that spans at least a portion of a pseudorandom noise (PRN) period.

9. The method of claim 8, further comprising:
   enabling one or more bins, of a plurality of bins that span the portion of the PRN period, utilizing the code shift value, and
   wherein accumulated complex rotated samples in the plurality of bins are utilized by a navigation receiver to perform at least one of (1) one or more correlation techniques, (2) one or more multipath mitigation techniques and (3) one or more Carrier Doppler frequency estimation techniques.

10. The method of claim 8, further comprising:
    utilizing one or more weighting vectors with at least the one or more complex rotated samples to generate at least one of a punctual signal and an early minus late signal, wherein the punctual signal and early minus late signal are utilized for tracking the integrated signal.

11. The method of claim 8, wherein the integrated signal is based on Asymmetric Constant Envelope Binary Offset Carrier (ACE-BOC) multiplexing.

12. The method of claim 8, wherein the at least one local code corresponds to one or more of (1) an early version of a code in the integrated signal, (2) a punctual version of the code in the integrated, and (3) a late version of the code in the integrated signal.

13. The method of claim 8, wherein the at least one local code is a single local code, and wherein the one or more complex rotated samples include an early complex rotated sample and a late complex rotated sample that are generated in parallel.

14. The method of claim 8, wherein the at least one local code includes three local codes, and wherein the one or more complex rotated samples include an early complex rotated sample, a punctual complex rotated sample, and a late complex rotated sample that are sequentially generated.

15. The method of claim 8, wherein a number of the one or more complex rotated samples generated for the sample is equal to N, and wherein N is less than or equal to a number of PRN code chips.

16. A navigation receiver, comprising:
    for an integrated signal with a plurality of signal components with arbitrary power allocation among the plurality of signal components;
    an integrated signal processing unit executed by a processor, the integrated signal processing unit configured to:
    generate at least one local code for a sample of the integrated signal;

select, for each local code of the at least one local code, a phase rotation value and a code shift value;

generate, based on the phase rotation value, one or more complex rotated samples for the sample; and accumulate the one or more complex rotated samples in one or more bins of a plurality of bins that span a window of any arbitrary width that is less than or equal to a number of code chips in a pseudorandom noise (PRN) code sequence.

17. The navigation receiver of claim 16, wherein the integrated signal is based on Asymmetric Constant Envelope Binary Offset Carrier (ACE-BOC) multiplexing.

18. The navigation receiver of claim 16, wherein accumulated complex rotated samples accumulated in the plurality of bins are utilized by the navigation receiver to perform at least one of (1) one or more correlation techniques, (2) one or more multipath mitigation techniques and, (3) one or more Carrier Doppler frequency estimation techniques.

19. The navigation receiver of claim 16, wherein accumulated complex rotated samples accumulated in the plurality of bins are utilized by the GNSS receiver to track the integrated signal.

20. The navigation receiver of claim 16, wherein the at least one local code is a single local code, and wherein the one or more complex rotated samples include an early complex rotated sample and a late complex rotated sample that are generated in parallel, or wherein the at least one local code includes three local codes, and wherein the one or more complex rotated samples include an early complex rotated sample, a punctual complex rotated sample, and a late complex rotated sample that are sequentially generated.

\* \* \* \* \*

UNITED STATES PATENT AND TRADEMARK OFFICE
CERTIFICATE OF CORRECTION

PATENT NO. : 12,000,935 B2
APPLICATION NO. : 17/543002
DATED : June 4, 2024
INVENTOR(S) : David A. Brown et al.

It is certified that error appears in the above-identified patent and that said Letters Patent is hereby corrected as shown below:

In the Specification

Column 1, Line 58:
"receiver may generate a local code for the sample of the is"
Should read:
"receiver may generate a local code for the sample of the"

Column 2, Line 6:
"(PIM) chip worth of code phase. The integrated signal"
Should read:
"(PRN) chip worth of code phase. The integrated signal"

Column 7, Line 32:
"As indicated above, in this example, the local code of is"
Should read:
"As indicated above, in this example, the local code of [1010] is"

Column 7, Line 34:
"of may be provided to a 4 bit encoder 202. The local code"
Should read:
"of [1010] may be provided to a 4 bit encoder 202. The local code"

Column 7, Line 36:
"301 that corresponds to the local code of to select a phase"
Should read:
"301 that corresponds to the local code of [1010] to select a phase"

Column 7, Line 38:
"column 303. In this example, the local code of corresponds"

Signed and Sealed this
Twentieth Day of May, 2025

Coke Morgan Stewart
*Acting Director of the United States Patent and Trademark Office*

Should read:

"column 303. In this example, the local code of [1010] corresponds"